United States Patent
Rönnäng

(10) Patent No.: US 11,468,716 B2
(45) Date of Patent: Oct. 11, 2022

(54) VEHICLE RESOURCE MANAGEMENT SYSTEMS

(71) Applicant: Volvo Car Corporation, Gothenburg (SE)

(72) Inventor: Lars Magnus Rönnäng, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 141 days.

(21) Appl. No.: 16/711,151

(22) Filed: Dec. 11, 2019

(65) Prior Publication Data

US 2021/0183170 A1  Jun. 17, 2021

(51) Int. Cl.
| | |
|---|---|
| *G07C 5/00* | (2006.01) |
| *G07C 5/08* | (2006.01) |
| *H04W 4/40* | (2018.01) |
| *H04W 28/26* | (2009.01) |

(52) U.S. Cl.
CPC ........... *G07C 5/008* (2013.01); *G07C 5/0816* (2013.01); *H04W 4/40* (2018.02); *H04W 28/26* (2013.01)

(58) Field of Classification Search
None
See application file for complete search history.

(56) References Cited

U.S. PATENT DOCUMENTS

| | | | | |
|---|---|---|---|---|
| 10,315,492 | B2 * | 6/2019 | Chelian | G01C 21/005 |
| 2004/0217179 | A1 * | 11/2004 | Garner | B60H 1/3226 |
| | | | | 236/1 C |
| 2010/0207812 | A1 * | 8/2010 | Demirdjian | G06Q 30/08 |
| | | | | 705/1.1 |
| 2012/0109851 | A1 | 5/2012 | Sanders | |
| 2016/0055509 | A1 | 2/2016 | Nyberg et al. | |
| 2016/0328965 | A1 * | 11/2016 | Safer | G08G 1/0133 |
| 2018/0137593 | A1 * | 5/2018 | Djuric | G06Q 50/30 |
| 2019/0051174 | A1 * | 2/2019 | Haque | G06Q 50/30 |
| 2019/0122468 | A1 * | 4/2019 | Endo | G07C 9/00309 |
| 2020/0137580 | A1 * | 4/2020 | Yang | H04W 12/06 |
| 2020/0180533 | A1 * | 6/2020 | Sakurada | B60N 2/0244 |
| 2020/0220731 | A1 * | 7/2020 | Schmitt | H04W 12/084 |
| 2020/0388161 | A1 * | 12/2020 | Kim | G08G 1/096791 |

OTHER PUBLICATIONS

Abdelhamid et al., "Vehicle as a Resource (VaaR)," Queen's University Canada, Mar. 7, 2014, 18 pp.
Abdelhamid et al., "On the Provisioning of Vehicle-Based Public Sensing Services," DIVANet 15, Nov. 6, 2015, pp. 71-77.
Lee et al., "MobEyes: Smart Mobs for Urban Monitoring with a Vehicular Sensor Network," IEEE Wireless Communications, vol. 13, Issue 5 , Oct. 2006, 6 pp.

* cited by examiner

*Primary Examiner* — Muhammad Adnan
(74) *Attorney, Agent, or Firm* — Shumaker & Sieffert, P.A.

(57) ABSTRACT

An example server device of this disclosure includes a communication unit and processing circuitry. The processing circuitry is configured to receive, via the communication unit, from one or more supplier-side modalities, one or more vehicle resource availability indicators, to receive, from one or more client devices, one or more vehicle resource usage requests, to match, each of the one or more vehicle resource usage requests to a subset of the vehicle resource indicators, and to send, via the communication unit, one or more match communications to the respective client device(s) and the supplier-side modalities from which the vehicle resource indicators are received.

20 Claims, 12 Drawing Sheets

VEHICLE RESOURCE MANAGEMENT SYSTEMS

BACKGROUND

Vehicles include components that can serve useful purposes even while the vehicle is not being driven. Additional features are increasingly being incorporated into commercially available vehicles, and existing features are being improved on an ongoing basis. Examples of vehicle features that parties may use while the vehicle is stationary include, but are not limited to, the trunk/boot space of the vehicle, the headlights or taillights of the vehicle, the air filter(s) of the vehicle, cameras (e.g., a backup camera) with which the vehicle is equipped, telemetry hardware of the vehicle, etc.

SUMMARY

Parties often fail to exploit vehicle components or modules during times at which the vehicle is not being driven. A common example of a time at which no party uses a vehicle's modules is the length of time during the day when the vehicle's driver is at his/her place of work. Typically, vehicles are parked in relatively dense concentrations during business hours, such as in the parking lot of an office building, or in a public or private parking garage. Aspects of this disclosure are directed to leveraging the volume, density, and stationary positioning of otherwise-unused vehicle modules for relatively prolonged periods of time (e.g., several hours at a stretch) to take advantage of a "smart city" grid or infrastructure.

Systems of this disclosure receive offers from vehicle owners (or "suppliers") with respect to using one or more vehicle modules during off-use hours. The systems of this disclosure also receive requests from potentially users (or "clients") to use the vehicle modules during the vehicles' off-use hours. If the overall time window of a request overlaps with some or all of the corresponding time window of an offer, the systems of this disclosure may match the request to the offer. In some examples, the systems of this disclosure may provide an stimulus portion of the request to the supplier of the selected offer. In this way, the systems of this disclosure match suppliers' offers to clients' requests to enable the use of vehicle modules during times when the vehicles is not in use but is conveniently positioned for the owners to collect the vehicles at a later time.

In one example, this disclosure describes a server device including a communication unit, and processing circuitry in communication with the communication unit. The communication unit is configured to receive, from a supplier-side modality, one or more vehicle resource availability indicators, where each of the one or more vehicle resource availability indicators includes an indication of a vehicle resource. The communication unit is further configured to receive, from one or more client devices, one or more vehicle resource usage requests, where each of the one or more vehicle resource usage requests includes an indication of a requested vehicle resource and a requested location of the requested vehicle resource, where each client device of the one or more client devices is associated with one of the one or more vehicle resource usage requests. The processing circuitry is configured to identify, based on the one or more vehicle resource availability indicators and the one or more vehicle resource usage requests, a particular vehicle resource usage request that matches a particular vehicle resource availability indicator and to send, via the communication unit, a respective match communication to each of the client device associated with the particular vehicle resource usage request and the supplier-side modality. The processing circuitry is further configured to send, responsive to receiving an acceptance communication from the supplier side modality, via the communication unit and to the supplier-side modality, an instruction that causes a display device of the supplier-side modality to display an indication of the requested location included in the particular vehicle resource usage request and to send, via the communication unit, navigation instructions to one or both of the supplier side modality or a navigation system of a particular vehicle associated with the particular vehicle resource availability indicator.

In another example, this disclosure describes a method implemented using processing circuitry. The method includes receiving, via a communication unit, from a supplier-side modality, one or more vehicle resource availability indicators, where each of the one or more vehicle resource availability indicators includes an indication of a vehicle resource, receiving, via the communication unit, from one or more client devices, one or more vehicle resource usage requests, where each of the one or more vehicle resource usage requests includes an indication of a requested vehicle resource and a requested location of the requested vehicle resource, where each client device of the one or more client devices is associated with one of the one or more vehicle resource usage requests, and identifying, based on the one or more vehicle resource availability indicators and the one or more vehicle resource usage requests, a particular vehicle resource usage request that matches a particular vehicle resource availability indicator. The method further includes sending, via the communication unit, a respective match communication to each of the client device associated with the particular vehicle resource usage request and the supplier-side modality, sending, responsive to receiving an acceptance communication from the supplier side modality, by the processing circuitry and to the supplier-side modality, an instruction that causes a display device of the supplier-side modality to display an indication of the requested location included in the particular vehicle resource usage request, and sending, by the processing circuitry, via the communication unit, navigation instructions to one or both of the supplier side modality or a navigation system of a particular vehicle associated with the particular vehicle resource availability indicator.

In another example, this disclosure describes an apparatus that includes means for receiving, from a supplier-side modality, one or more vehicle resource availability indicators, where each of the one or more vehicle resource availability indicators includes an indication of a vehicle resource, means for receiving, from one or more client devices, one or more vehicle resource usage requests, where each of the one or more vehicle resource usage requests includes an indication of a requested vehicle resource and a requested location of the requested vehicle resource, where each client device of the one or more client devices is associated with one of the one or more vehicle resource usage requests. The apparatus further includes means for identifying, based on the one or more vehicle resource availability indicators and the one or more vehicle resource usage requests, a particular vehicle resource usage request that matches a particular vehicle resource availability indicator, means for sending a respective match communication to each of the client device associated with the particular vehicle resource usage request and the supplier-side modality, means for sending, responsive to receiving an acceptance communication from the supplier side modality and to the supplier-side modality, an instruction that causes a display device of the supplier-side modality to display an indication of the requested location included in the particular vehicle resource usage request, and means for sending navigation instructions to one or both of the supplier side modality or a navigation system of a particular vehicle associated with the particular vehicle resource availability indicator.

In another example, this disclosure describes a non-transitory computer-readable medium encoded with instructions. The instructions, when executed, cause processing circuitry of a computing system to receive, from a supplier-side modality, one or more vehicle resource availability indicators, where each of the one or more vehicle resource availability indicators includes an indication of a vehicle resource, to receive, from one or more client devices, one or more vehicle resource usage requests, where each of the one or more vehicle resource usage requests includes an indication of a requested vehicle resource and a requested location of the requested vehicle resource, where each client device of the one or more client devices is associated with one of the one or more vehicle resource usage requests, and to identify, based on the one or more vehicle resource availability indicators and the one or more vehicle resource usage requests, a particular vehicle resource usage request that matches a particular vehicle resource availability indicator. The instructions, when executed, further cause the processing circuitry of the computing device to send a respective match communication to each of the client device associated with the particular vehicle resource usage request and the supplier-side modality, to send, responsive to receiving an acceptance communication from the supplier side modality, to the supplier-side modality, an instruction that causes a display device of the supplier-side modality to display an indication of the requested location included in the particular vehicle resource usage request, and to send navigation instructions to one or both of the supplier side modality or a navigation system of a particular vehicle associated with the particular vehicle resource availability indicator.

The systems and techniques described in this disclosure provide several technical improvements over currently available technology. By centrally processing client-side requests and matching them to available supply-side offers, the systems of this disclosure enable client entities and vehicle owners to collaboratively leverage a "smart city" infrastructure to put vehicle modules to productive use during the vehicles' off-use hours. The systems of this disclosure are scalable, providing request-offer matching to take advantage of smart city functions in municipalities of varying sizes, infrastructures, and vehicle counts. Additionally, the systems of this disclosure increase the throughput of various vehicle modules by activating the modules while the vehicle is not being used by the owner.

In various use case scenarios, the systems of this disclosure match a client-submitted request to a supplier even though the request reflects a sub-optimal solution for that particular supplier during business hours. For example, acceptance of the request may require the supplier to park his/her vehicle farther away from the supplier's place of work, in comparison to other parking options available to the supplier, but that are not associated with client-submitted requests. In some examples, the systems of this disclosure may send navigation instructions to an in-vehicle navigation system or to a hardware modality implementing a navigation application, thereby providing navigation communications for the particular vehicle to be placed at the requested location to fill the matched request.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
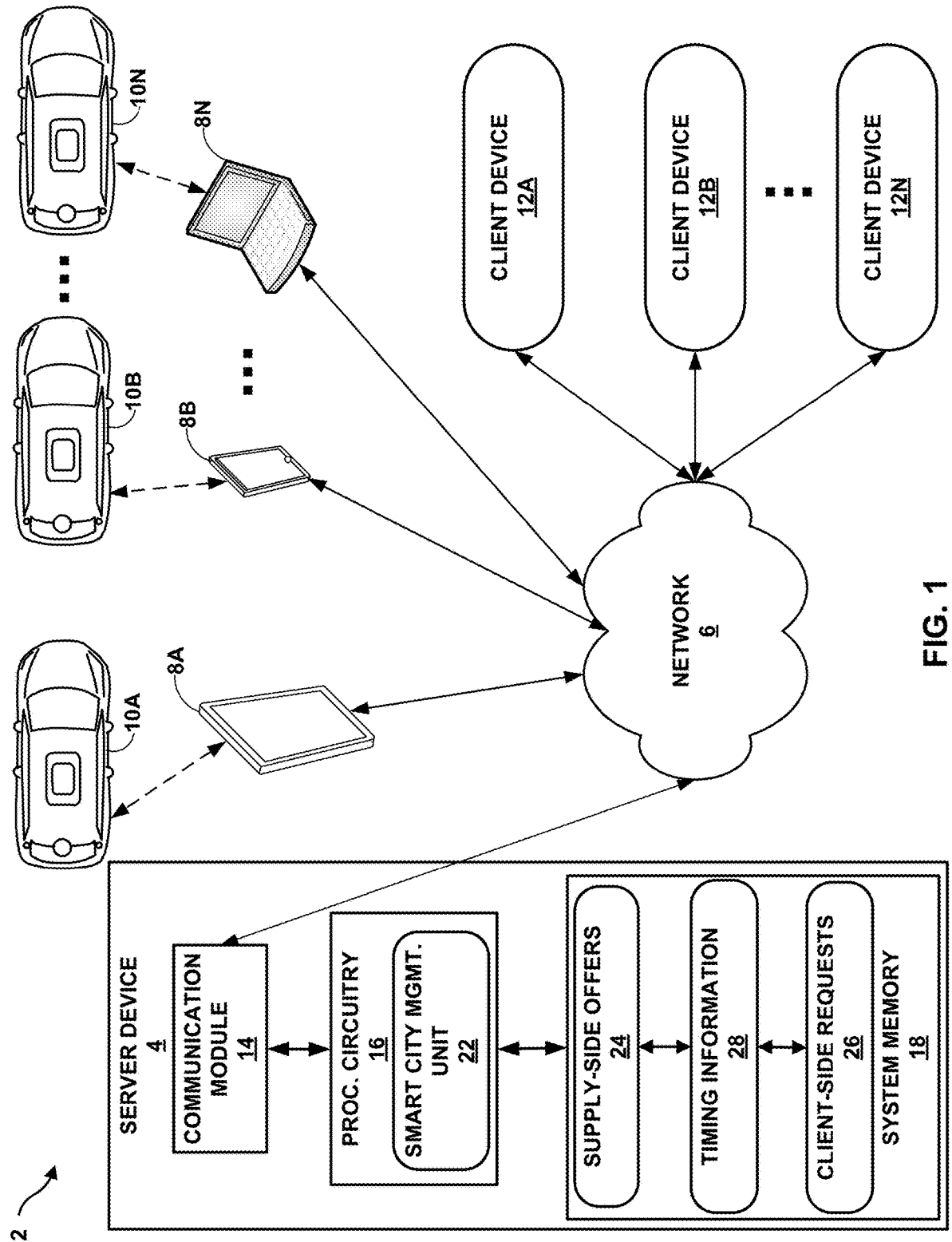
FIG. 1 is a block diagram illustrating an example system of this disclosure, in which a server device communicates via a network to process supplier-side and client-side submissions to manage aspects of a smart city or multiple smart cities, in accordance with aspects of this disclosure.

FIG. 1 is a block diagram illustrating an example system 2 of this disclosure, in which a server device 4 communicates via a network 6 to process supplier-side and client-side submissions to manage aspects of a smart city infrastructure or multiple smart city infrastructures, in accordance with aspects of this disclosure. In the example of FIG. 1, server device 4 processes supply-side communications generated by one or more of supplier-side modalities 8A-8N ("supplier-side modalities 8") and received over network 6 from supplier-side modalities 8. The supplier-side communications generated by supplier-side modalities 8 include offers to use various components or modules of one or more of corresponding vehicles 10A-10N ("vehicles 10") during off-use hours. The client-side communications processed by server device 4 are generally reciprocal to the supplier-side communications, in that the client-side communications include requests to utilize various components/modules of vehicles 10 during off-use hours. Server 4 receives the client-side communications from one or more of client devices 12A-12N ("client devices 12") over network 6.

Network 6 may incorporate aspects of the Internet or another public network. While not explicitly shown in FIG. 1 for ease of illustration purposes, network 6 may incorporate network architecture comprising various intermediate devices that communicatively link server device 4 to one or more of supplier-side modalities 8. Examples of such devices include wireless communication devices such as cellular telephone transmitters and receivers, Wi-Fi® radios, GPS receivers, Ethernet® cards, etc. As such, network 6 represents any combination of wired and/or wireless networks that enables communication between server device 4 and supplier-side modalities 8. Network 6 delivers data to supplier-side modalities 8 using wired and/or wireless "last mile" components, and network 6 may also incorporate various types of intermediate-stage routers and other interconnected devices to enable long-range connectivity.

As shown in FIG. 1, supplier-side modalities 8 represent any of a variety of user-facing devices, including, but not limited to, tablet computers (as in the case of supplier-side modality 8A), smartphones (as in the case of supplier-side modality 8B), laptop computers (as in the case of supplier-side modality 8C), desktop computers, wearable computing devices, or any other computing device capable of direct or indirect connection to network 6. The "last mile" connection between any one of supplier-side modalities 8 and a respective edge interface of network 6 may be implemented as a wired connection or a wireless connection.

Supplier-side modalities 8 may upload offer communications (in the form of vehicle resource availability indicators) to server device 4 via network 6. The vehicle resource availability indicators pertain to the availability of components/modules or other resources of one or more of vehicles 10 during off-use hours, such as during business hours, when the owners of vehicles 10 (or "suppliers") may be at work. The suppliers may use supplier-side modalities 8 to upload the vehicle resource availability indicators to communicate the availability of modules (or "vehicle resources") of vehicles 10 well in advance of the availability, shortly before the availability, or even after the vehicle resource(s) have become available during off-use hours of the respective vehicle(s) 10. The suppliers may use a single supplier modality 8 to submit offers with respect to one of vehicles 10, or multiple vehicles 10 (although the particular non-limiting example of FIG. 1 illustrates a one-to-one mapping between supplier-side modalities 8 and vehicles 10). As such, each vehicle resource availability indicator includes an indication of at least one vehicle resource that is available for use at a particular time, for a particular duration.

Vehicles 10 may include various means of transport, including, but not limited to, motor vehicles. While vehicles 10 are shown as passenger cars in FIG. 1 as an example, it will be appreciated that vehicles 10 may include one or more of buses, recreational vehicles (RVs), semi-trailer trucks, tractors or other types of farm equipment, motorcycles, personal transport vehicles, automobiles, and so on. The suppliers may use supplier-side modalities 8 to submit offers indicating the availability of various modules of vehicles 10, such as trunk space or boot space (e.g., to receive packages delivered by courier services, parcel delivery services, private carriers, postal carriers, etc.), camera hardware (e.g. the use of backup cameras or other camera hardware to monitor activity within a parking garage, parking lot, etc.), air filters (e.g., to filter the air in polluted areas), headlights or taillights (e.g., to illuminate a poorly lit area to assist pedestrians), or others.

Vehicles 10 represent an ad hoc fleet of vehicles in the smart city managed by server device 4. Some, all, or none of vehicles 10 may be configured to automate one or more tasks associated with vehicle operation. Some of vehicles, all, or none of vehicles 10 may be equipped with communication logic and interface hardware, by which each of each of vehicles 10 may send and receive data over network 6. In some such examples, the owner of the particular vehicle 10 may choose to submit supplier-side offers for that particular vehicle 10 using the communication logic of the particular vehicle 10, instead of using any of supplier-side modalities 8.

Client devices 12 represent hardware modalities controlled by various entities ("clients") that may submit vehicle resource usage requests to avail of modules of vehicles 10 during off-use hours of vehicles 10, such as during business hours. Each of the vehicle resource usage requests includes an indication of a requested vehicle resource (e.g., a module of any of vehicles 10), and also includes a requested location of the requested vehicle resource (e.g., the place at which the request can be fulfilled). Examples of clients operating client devices 12 may include factories or other manufacturing units that output particulate matter (PM) such as fumes, dust, smoke, gases, fly ash, soot, smoke, aerosols, mists, condensing vapors, or other contaminants in the air. The suspension of PM alters the air quality of the affected environment around the clients controlling client devices 12 that that output PM. In some examples in which one or more of clients 12 represent entities that output PM into the surrounding air, client devices 12 may submit requests to use the air filters of one or more of vehicles 10 during operating hours, which may overlap with the off-use hours of one or more of vehicles 10. These requests may be generally reciprocal to vehicle resource availability indicators submitted by supplier-side modalities 8 that offer the availability of air filters of vehicles 10 during business hours. For instance, supplier-side modalities 8 may submit vehicle resource availability indicators that reflect offers to run the air filters of vehicles 10 during business hours without running the engines (whether internal combustion, hybrid, or electric engines) of vehicles 10 during the discrete time period related to the vehicle resource availability indicators.

In some examples, client devices 12 may be controlled by clients that include owners or administrators of a parking facility, such as a parking garage. Parking garage owners who control client devices 12 may submit requests to use camera hardware of vehicles 10 or a combination of camera hardware and telemetry hardware of vehicles 10, to implement or improve surveillance inside a parking garage during business hours. The requests may be generally reciprocal to offers submitted by supplier-side modalities 8 that indicate availability of camera hardware (e.g., backup camera hardware) or a combination of camera hardware and telemetry hardware of vehicles 10 during business hours. While described with respect to camera-based image capture capabilities as an example, it will be appreciated that supplier-side modalities 8 and client devices 12 may submit surveillance-related offers and requests that are based on other sensor hardware (e.g., LiDAR hardware) of vehicles 10, as well.

In some examples, clients controlling client devices 12 may include a delivery service, such as a courier service, a parcel delivery service, a private carrier, a local postal carrier, etc. In some examples, clients that control client devices 12 may include private parties desiring a safe and secure location to receive deliveries, such as individuals who wish to receive deliveries during business hours but do not want to use the option to have the delivery left at the door of a physical address. In one or both of these scenarios, client devices 12 may submit vehicle resource usage requests to have items delivered to the trunk or boot of any of vehicles 10 during business hours. The vehicle resource usage requests may be generally reciprocal to vehicle resource availability indicators submitted by supplier-side modalities 8 that indicate availability of trunk space or boot space during business hours. While described with respect to trunk/boot space as an example in this disclosure, it will be appreciated that supplier-side modalities 8 and client devices 12 may also submit vehicle resource availability indicators and vehicle resource usage requests with respect to other available space of vehicles 10, as well, such as overhead carrier space, etc.

In some examples, client devices 12 may be controlled by clients that include private parties or other entities desiring increased lighting at an area with parking amenities. For instance, a business that is open at night may wish to avail of vehicle headlights or taillights to illuminate the entry area of the place of business. As another example, individuals who plan to walk at night may want to avail of vehicle headlights or taillights to illuminate a portion or all of the planned walking route. In one or both of these scenarios, client devices 12 may submit vehicle resource usage requests to activate headlights or taillights of vehicles 10. The requests may be generally reciprocal to vehicle resource availability indicators submitted by supplier-side modalities 8 that indicate availability of the headlight and/or taillight modules of vehicles 10 during certain times of the night. The vehicle resource offers and vehicle resource usage requests pertaining to the use of the headlights and/or taillights of vehicles 10 are generally applicable to non-business off-use hours (e.g., at night), and as such, the parking locations of vehicles 10 may be street parking locations in residential areas, in mixed-use residential/business zones, or other locations where the suppliers may stow vehicles 10 overnight.

Server device 4 may represent a portion of or an entirety of a "cloud-based" system for smart city management, as it pertains to the shared use of vehicle resources available from vehicles 10. Among other functionalities, server device 4 may be configured to receive, store, and match both vehicle resource availability indicators and vehicle resource usage requests with respect to shared usage of modules of vehicles 10 during off-use hours of vehicles 10. Server 4 may implement the techniques of this disclosure to manage vehicle module sharing in the context of managing smart cities of varying sizes. As used herein, the term "smart city" need not always conform to municipal boundaries defining city limits, but rather, defines a range within which server device 4 manages shared usage of modules of vehicles 10.

Server device 4 uses communication module 14 to receive information (e.g., offers from supplier-side modalities 8 and requests from client devices 12) via network 6. It will be appreciated that communication module 14 may equip server device 4 with an either a direct interface or a transitive interface to network 6. In cases where communication module 14 represents a direct interface to network 6, communication module 14 may include, be, or be part of various wireless communication hardware, including, but not limited to, one or more of an Ethernet card, or Bluetooth®, 3G, 4G, 5G, or Wi-Fi® radios. In cases where communication module 14 represents a first link in a transitive interface to network 6, communication module 14 may represent wired communication hardware, wireless communication hardware (or some combination thereof), such as any one or any combination of a network interface card (e.g, an Ethernet card and/or a Wi-Fi® dongle), USB hardware, an optical transceiver, a radio frequency transceiver, Bluetooth®, 3G, 4G, 5G, or Wi-Fi® radios, and so on. Network 6 may also enable the illustrated devices to communicate triangulated coordinate information conforming to GPS and/or dGPS and/or navigation instructions amongst one another.

While communication module 14 is illustrated as a single, standalone component of server device 4, it will be appreciated that, in various implementations, communication module 14 may form multiple components, whether linked directly or indirectly. Moreover, portions of communication module 14 may be integrated with other components of server device 4. At any rate, communication module 14 represents network hardware that enables server device 4 to reformat data (e.g., by packetizing or depacketizing) for communication purposes, and to transmit and/or receive data in various formats over network 6. Communication module 14 may also be referred to a "communication unit" or generally as "communication hardware" of server device 4.

Communication module 14 of server device 4 is communicatively coupled to processing circuitry 16 of server device 4. Processing circuitry 16 may be formed in one or more microprocessors, application specific integrated circuits (ASICs), field programmable gate arrays (FPGAs), digital signal processors (DSPs), processing circuitry (including fixed function circuitry and/or programmable processing circuitry), or other equivalent integrated logic circuitry or discrete logic circuitry. As shown in FIG. 1, processing circuitry 16 is communicatively coupled to system memory 18 of server device 4.

System memory 18, in some examples, are described as a computer-readable storage medium and/or as one or more computer-readable storage devices. In some examples, system memory 18 may include, be, or be part of temporary memory, meaning that a primary purpose of system memory 18 is not long-term storage. System memory 18, in some examples, is described as a volatile memory, meaning that system memory 18 does not maintain stored contents when server device 4 is turned off. Examples of volatile memories include random access memories (RAM), dynamic random access memories (DRAM), static random access memories (SRAM), and other forms of volatile memories known in the art.

In some examples, system memory 18 is used to store program instructions for execution by processing circuitry 16. System memory 18, in one example, is used by logic, software, or applications implemented by server device 4 to temporarily store information during program execution. As described above, system memory 18, in some examples, also include one or more computer-readable storage media. Examples of such computer-readable storage media may include a non-transitory computer-readable storage medium, and various computer-readable storage devices.

In some implementations, system memory 18 may be configured to store larger amounts of information than volatile memory. In these examples, system memory 18 may further be configured for long-term storage of information. In some of these examples, system memory 18 includes non-volatile storage elements. Examples of non-volatile storage elements include magnetic hard discs, optical discs, floppy discs, flash memories, or forms of electrically programmable memories (EPROM) or electrically erasable and programmable (EEPROM) memories.

Processing circuitry 16 includes smart city management unit 22. Smart city management unit may decapsulate data packets received from supplier-side modalities and client devices 12, and may implement further processing of the payload data of the received packets. For instance, smart city management unit 22 may determine whether or not a particular payload is applicable to offers received from supplier-side modalities 8 and/or requests received from client devices 12. Smart city management unit 22 may store portions of the decapsulated, processed payloads to system memory 18.

If smart city management unit 22 determines that certain processed payloads are associated with offers received from supplier-side modalities 8, smart city management unit 22 may store those particular payload portions to system memory 18 as supply-side offers 24. Supply-side offers 24 reflect vehicle resource availability indicators received from supplier-side modalities 8 that include offers to avail of capabilities of vehicles 10 during off-use hours. If smart city management unit 22 determines that certain processed payloads are associated with requests received from client devices 12, smart city management unit 22 may store those particular payload portions to system memory 18 as client-side requests 26.

In the example of FIG. 1, smart city management unit 22 also stores availability information 28 to system memory 18. Availability information 28 includes aspects of both supply-side offers 24 and client-side requests 26. For instance, availability information 28 may reflect time periods during which the vehicle resources of vehicles 10 are offered for usage by clients who operate client devices 12. Availability information 28 may also reflect discrete time periods to which client-side requests 26 apply. That is, with respect to client-side requests 26, availability information 28 may indicate time periods specified by client devices 12 in the vehicle resource usage requests, with respect to using the requested vehicle resources of vehicles 10.

In response to detecting time overlaps indicated by availability information 28 corresponding to supply-side offers 24 and client-side requests 26 that are of sufficient duration to fill the matched request, smart city management unit 22 may initiate a matching process of this disclosure. For instance, if smart city management unit 22 detects a timing overlap between one of client-side requests 26 and one or more of supply-side offers 24, then smart city management unit 22 may inspect other aspects of the corresponding vehicle resource availability indicator and vehicle resource usage request, such as the vehicle capability being offered/requested, the location at which the vehicle resource usage request can be fulfilled, the distance between the location corresponding to the vehicle resource usage request and the supplier's place of work, etc.

If smart city management unit 22 determines that the capability of vehicles 10 reflected in the temporally overlapping supply-side offer(s) 24 and client-side request 26 is the same, then smart city management unit 22 may identify a potential match. In turn, smart city management unit 22 may prioritize the supply-side offers 24 based on one or more criteria, such as the proximity of the supplier's preferred parking location to the location at which the vehicle resource usage request can be fulfilled, loyalty program membership of the vehicle owners who submitted the corresponding vehicle resource availability indicator(s), heuristic data regarding the request-fulfillment rate of the vehicle owners, the length of the temporal overlap between the identified supply-side offer(s) 24 and client-side request 26, etc.

Smart city management unit 22 may use heuristic data indicating one or both of acceptance history and/or usage fulfillment history of the users who originated the vehicle resource availability indicators associated with supply-side offers 24. For instance, the heuristic data associated with acceptance history may provide smart city management unit 22 with information on the user's (or the user identity's) history of accepting client-side requests 26 after receiving a match communication from smart city management unit 22. The heuristic data associated with usage fulfilment history may provide smart city management unit 22 with information on the user's (or the user identity's) history of following through and providing the requested capability(ies) of the respective vehicle 10 after accepting one or more of client-side requests 26. In this way, smart city management unit 22 may leverage heuristic data indicating acceptance history and/or fulfillment history of the users of vehicles 10 to prioritize match communication orders in multi-match scenarios.

Additionally, smart city management unit 22 may process stimuli associated with client-side requests 26. For example, the vehicle resource usage requests received from client devices 12 may include quid pro quo offers from the clients, to induce the suppliers to select those particular clients with respect to the respective offers of the capabilities of vehicles 10. As one non-limiting example, one or more of client-side requests 26 may be associated with stimuli such as free/discounted parking, free/discounted battery charging or other types of free/discounted fuel provision, in exchange for parking vehicles at those clients' sites during off-use hours. As another example, one or more of client-side requests 26 may be associated with stimuli such as shopping discounts or gift cards.

By processing stimuli associated with client-side requests 26, smart city management unit 22 may take into consideration some of client-side requests 26 that represent sub-optimal parking solutions for vehicle owners, in determining matches with corresponding supply-side offers 24. That is, by using the stimulus as a counterweighing factor, smart city management unit 22 increases the pool of potentially acceptable vehicle resource usage requests, thereby improving the number of available and potentially successful barters to administrate the smart city infrastructure managed by server device 4.

Upon identifying matches in this way, smart city management unit 22 may invoke communication module 14 to send one or more match communications to supplier-side modalities 8. For instance, smart city management unit 22 may send one or more match communications that represent sub-optimal parking solutions with respect to the vehicle owners of vehicles 10. Smart city management unit 22 may also send (whether as part of the match communications or out-of-band) the stimulus for the client-side request(s) 26 that are included in the match communications. By communicating the stimuli within or in addition to the match communications, smart city management unit 22 may increase the acceptance rate of client-side request(s) 26, thereby improving the smart city operations of the smart city reflected by system 2.

If smart city management unit 22 receives acceptance communications from supplier-side modalities for any of the match communications, smart city management unit 22 may invoke communication module 14 to send the accepted match communication to the originating client device(s) 12. The matches between supply-side offers 24 and client-side requests 26 may be one-to-one functions or many-to-one functions. An example of a one-to-one match function is a use case scenario in which smart city management unit 22 matches a supply-side offer 24 to use trunk space as a drop-off point for a delivery to a single client-side request 26 requesting the use of trunk space as a drop-off point for a delivery.

An example of a many-to-one match function is a use case scenario in which smart city management unit 22 matches multiple supply-side offers 24 to a single client-side request 26 requesting the use of air filter functionalities at a PM-emitting site. In this way, smart city management unit 22 implements the matching techniques of this disclosure in a flexible and scalable way to accommodate and potentially fulfill both vehicle resource usage requests of varying scales, ranging from small to large.

In some examples, once a match communication is accepted, smart city management unit 22 may invoke communication module 14 to send GPS coordinates or navigation instructions to supplier-side modalities 8 or directly to the corresponding vehicle 10, directing the respective vehicle 10 to the parking location at which the matched offer can be fulfilled. For example, smart city management unit 22 may send instructions to telemetry hardware of the corresponding vehicle 10 to update the destination coordinates that are presently being processed by the navigation system or autonomous driving navigation module of the respective vehicle 10. As another example, smart city management unit 22 may send instructions to the corresponding supplier-side modality 8 to update the destination coordinates on locally executing mapping applications, if the supplier-side modality 8 is being as the in-cabin navigation device during the journey. For instance, smart city management unit 22 may send instructions that cause a display device of the particular supplier-side modality 8 to display an indication of the requested location (whether as a proposed destination in the context of a navigation app running on the supplier-side modality 8, as a communication of the details of the matched offer-request combination, etc.) of the matched vehicle resource usage request.

In this way, server device 4 may facilitate smart city management using capabilities of vehicles 10 as shared resources within the geographic area shown by system 2 of FIG. 1. By implementing the techniques of this disclosure, server device 4 improves efficient utilization and load-balancing with respect to vehicle resource deployment during off-use hours of vehicles 10. In this manner, the techniques of this disclosure reduce load and bandwidth consumption on dedicated providers, such as on virtual mailbox services, emission credit managers, etc.

Figure 2A:
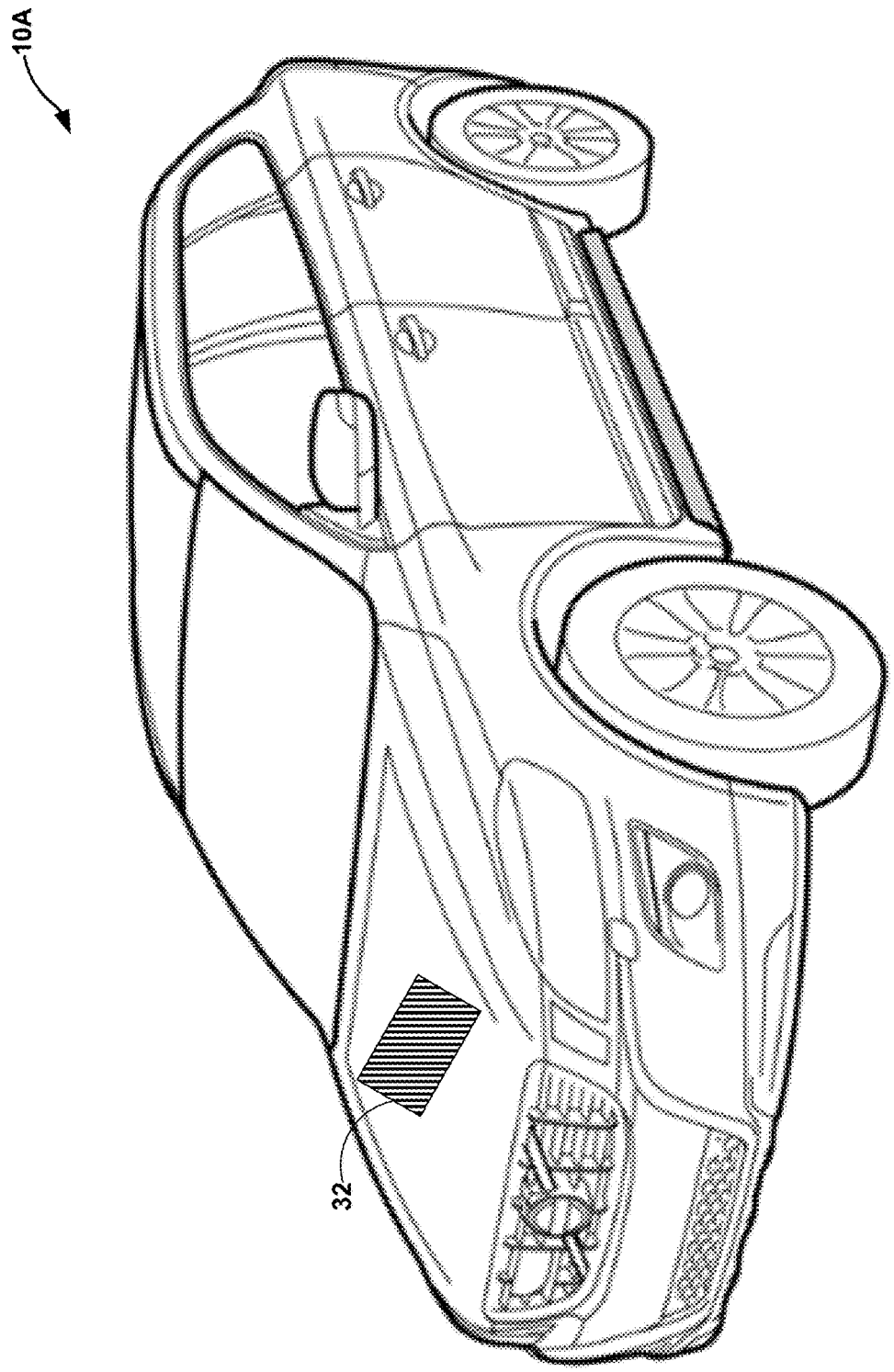
FIGS. 2A and 2B are conceptual diagrams illustrating the management of a shareable vehicle capability according to aspects of this disclosure.
Figure 2B:
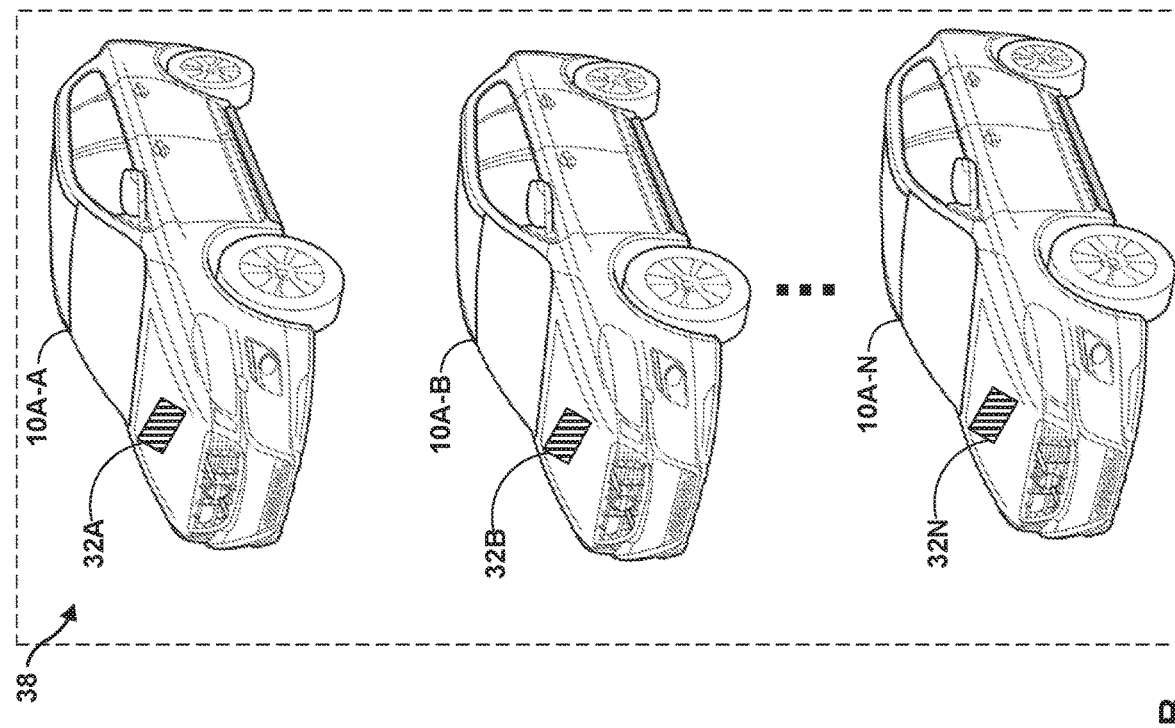
Figure 2B:
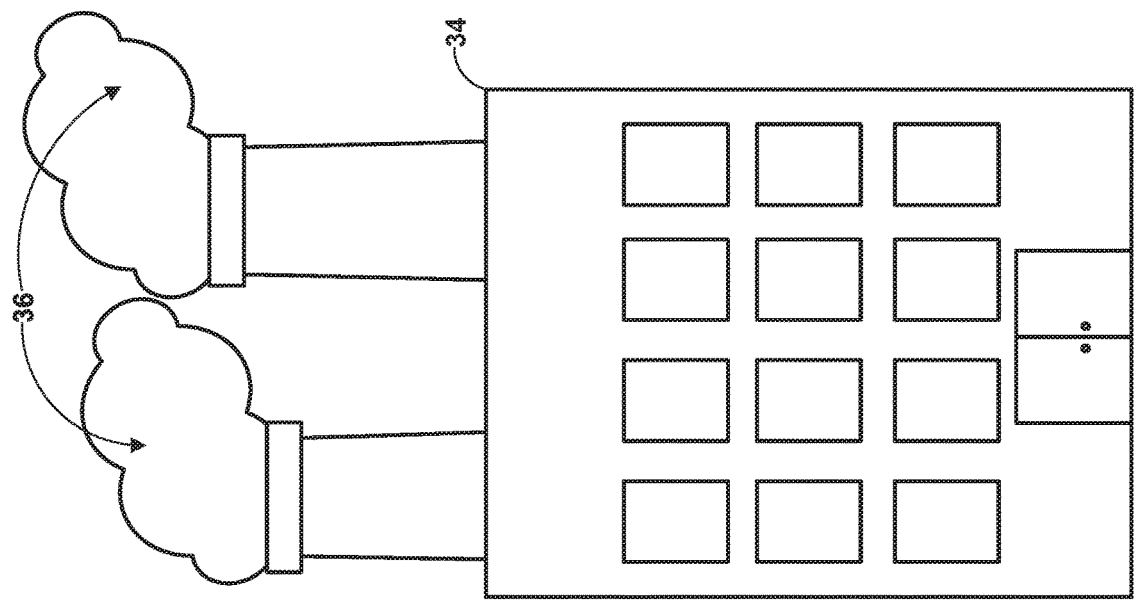

FIGS. 2A and 2B are conceptual diagrams illustrating the management of a shareable vehicle capability according to aspects of this disclosure. FIG. 2A is a conceptual diagram illustrating an example of a shareable vehicle capability of one of vehicles 10 shown in FIG. 1. Vehicle 10A is shown in FIG. 2A, although it will be appreciated that any of vehicles 10A-10N of FIG. 1 may provide the sharable vehicle capability discussed with respect to FIG. 2A. The vehicle capability shown in FIG. 2A relates to filtering ambient air, and is performed by air filter 32. The owner, lessee, or party otherwise in control of vehicle 10A (the "supplier") may offer the use of air filter 32 in a vehicle resource availability indicator uploaded via one of supplier-side modalities 8.

For example, the supplier may configure the vehicle resource availability indicator to identify the filtration capability of air filter 32 as the capability being offered for use, and to identify a discrete time period during which air filter 32 is available to be used by a party (e.g., client) other than the supplier. For example, the vehicle resource availability indicator may identify the hours of the day during which the supplier is at work and not using vehicle 10A, or during which the supplier is at home and not using vehicle 10A (e.g., overnight).

FIG. 2B illustrates a scenario in which server device 4 administrates the sharing of air filtration capabilities in a smart city according to techniques of this disclosure. FIG. 2B illustrates facility 34, emissions 36, and parking area 38. Vehicles 10A-A through 10A-N ("vehicles 10A") represent instances of the generic vehicle 10A illustrated in FIG. 2A. Similarly, air filters 32A-32N ("air filters 32") represent instances of the generic air filter 32 illustrated in FIG. 2A. Facility 34 may be owned or operated by a client that submits vehicle resource usage requests via one or more of client devices 12 illustrated in FIG. 1. In the example of FIG. 2B, facility 34 represents a building or other structure that emits PM into the surrounding air. The PM output by facility 34 is shown in FIG. 2B as emissions 36.

The client in control of facility 34 may submit a vehicle resource usage request that solicits the use of the filtration capability of air filters 32 during off-use hours of vehicles 10A. The client in control of facility 34 may request the suppliers to park vehicles 10A in parking area 38 during off-use hours, and run air filters 32 while vehicles 10A are parked in parking area 38. Parking area 38 may represent a parking lot or garage owned or rented by the client operating facility 34, or may represent public parking facilities in the vicinity of facility 34. In some examples, parking area 38 represents areas surrounding facility 34 in which vehicles 10A may be parked during off-use hours.

In any event, parking area 38 represents one or a combination of the parking facilities listed above, and is sufficiently proximate to facility 34, such that air filters 32, when activated, at least partially remove the PM of emissions 36 from the air in the vicinity of facility 34. The client in control of facility 34 may pair the vehicle usage request with one or more stimuli, such as gift cards, cash payments, free/discounted charging, fuel reimbursements, free/discounted car-washes, etc. By causing (e.g., through the use of one or more stimuli) the suppliers to park vehicles 10A in parking area 38 and run air filters 32 during off-use hours, the client may trap emissions 36 within the immediate vicinity of facility 34, thereby stemming the spread of emissions 36 into the smart city or into neighboring areas.

Server device 4 may match multiple vehicle resource availability indicators to the vehicle resource usage request in a many-to-one fashion to partially or completely fulfill the vehicle resource usage request for air filter usage. Server device 4 may provide match communications and stimulus information to the suppliers, and may provide acceptance communications to the client, thereby communicating the planned resource sharing scheme for the overlapping time period detected using availability information 28. Server device 4 may send instructions to supplier-side modalities 8 that cause respective display devices to display respective indications of the requested location (in this case, parking area 38 or the general vicinity thereof) included in the matched vehicle resource usage request Server device 4 may send GPS coordinates or navigation instructions to supplier-side modalities 8 or directly to vehicles 10A, directing vehicles 10A to parking area 38. For example, server device 4 may send instructions to telemetry hardware of vehicles 10A to update the destination coordinates that are presently being processed by the navigation system or autonomous driving navigation module of vehicles 10A, to reflect a destination of parking area 38. As another example, server device 4 may send instructions to the corresponding supplier-side modalities 8 to update the destination coordinates on locally-executing mapping applications, if these supplier-side modalities 8 are being as the in-cabin navigation device during the journeys of vehicles 10A.

In the use case scenario illustrated in FIG. 2B, server device 4 implements the techniques of this disclosure to facilitate the sharing of the filtration capabilities of air filters 32. By facilitating the sharing of the filtration capabilities of air filters 32 during off-use hours of vehicles 10A, server device 4 improves resource throughput in the smart city, and also improves air quality in the smart city and surrounding areas. Moreover, by facilitating the sharing of the filtration capabilities of air filters 32 during off-use hours of vehicles 10A, server device 4 may aid in the reduction of PM emissions, and thereby reduce the burden on emission credit management entities and/or regulatory entities that monitor PM emissions. Additionally, by activating air filters 32 to clean the air of the surrounding environment, server device 4 implements the techniques of this disclosure to improve the throughput of air filters 32 to benefit the smart city, and to use air filters 32 in an added way that is typically not exploited.

Figure 3A:
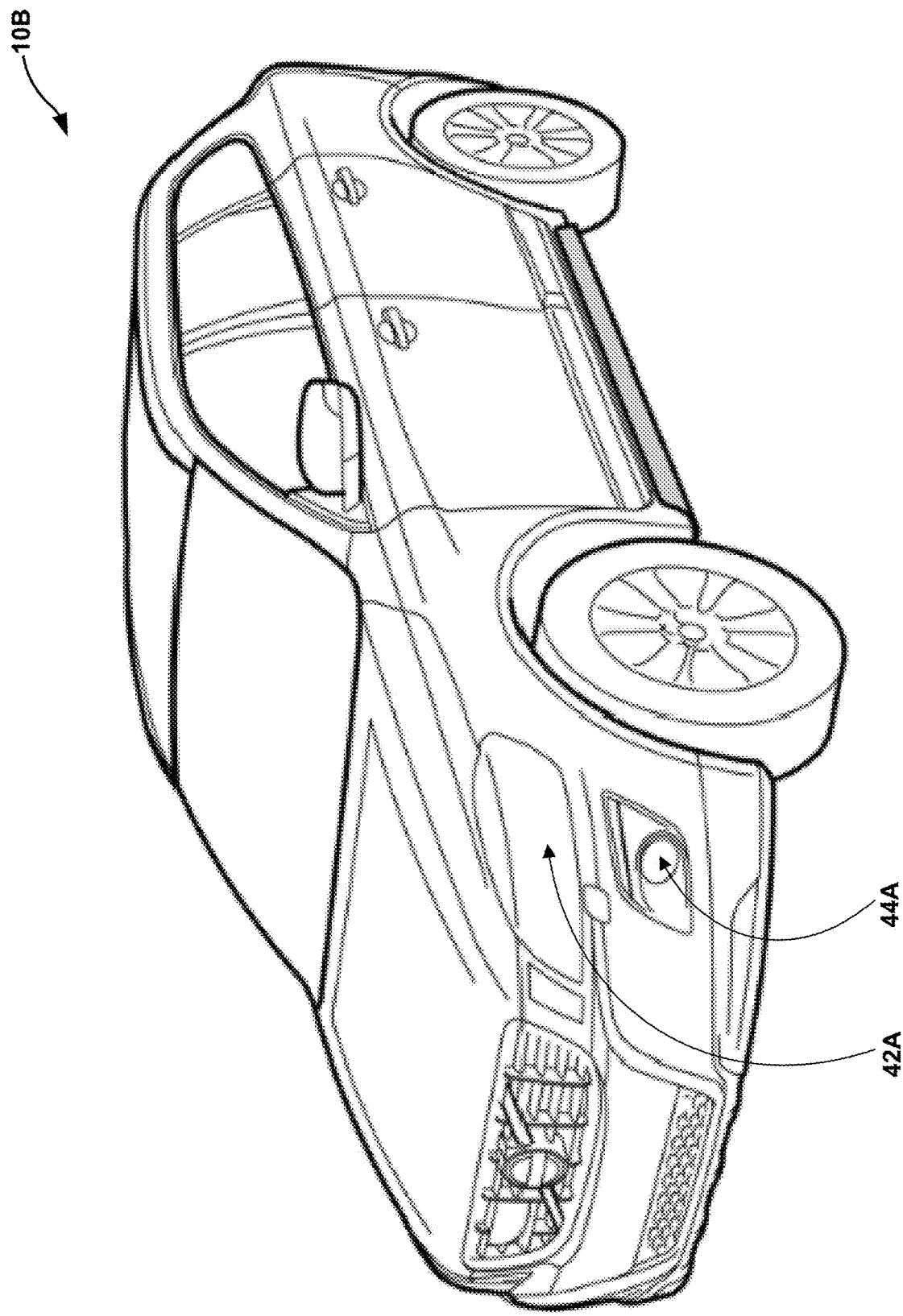
FIGS. 3A-3D are conceptual diagrams illustrating the management of another shareable vehicle capability according to aspects of this disclosure.

FIG. 3A is a conceptual diagram illustrating an example of a shareable vehicle capability of one of vehicles 10 shown in FIG. 1. Vehicle 10B is shown in FIG. 3A, although it will be appreciated that any of vehicles 10A-10N of FIG. 1 may provide the sharable vehicle capability discussed with respect to FIG. 3A. The vehicle capability shown in FIG. 3A relates to out-of-cabin illumination, and can be performed by headlights, foglamps, taillights, or other lighting components positioned on the body of vehicle 10B. The owner, lessee, or party otherwise in control of vehicle 10B (the "supplier") may offer the use of air filter 32 in a vehicle resource availability indicator uploaded via one of supplier-side modalities 8.

FIGS. 3A-3D are conceptual diagrams illustrating the management of another shareable vehicle capability according to aspects of this disclosure. FIG. 3A shows deactivated headlight 42A and deactivated foglamp 44A. The "deactivated" state indicates that deactivated headlight 42A and deactivated foglamp 44A are presently turned off, and are not providing illumination at the present time. In some examples, the supplier may configure the vehicle resource availability indicator to identify the illumination capabilities of deactivated headlight 42A when turned on and/or deactivated foglamp 44A when turned on as the capabilities being offered for use. The supplier may also configured the vehicle resource availability indicator to identify a discrete time period during which deactivated headlight 42A and deactivated foglamp 44A are available to be used by a party (e.g., client) other than the supplier. For example, the vehicle resource availability indicator may identify the hours of the night during which the supplier does not expect to need to use vehicle 10A.

Figure 3B:
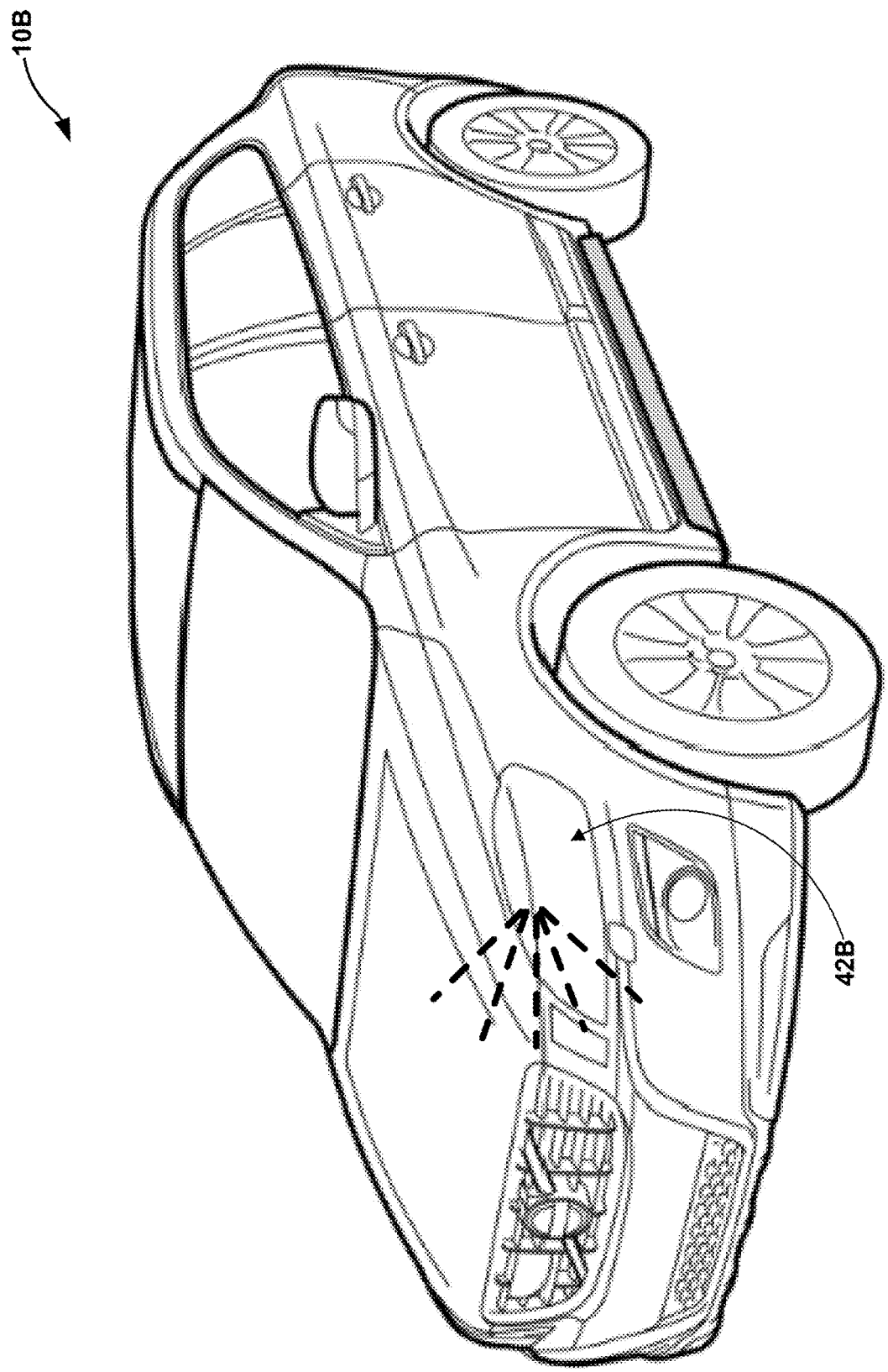

FIG. 3B is a conceptual diagram illustrating vehicle 10B with activated headlight 42B. The "activated" state indicates that activated headlight 42B is turned on, providing out-of-cabin illumination. Various vehicle resource usage requests, such as requests to illuminate a business entryway or a walking path, may require the activated state illustrated with respect to activated headlight 42B, in order to fulfill the request.

Figure 3C:
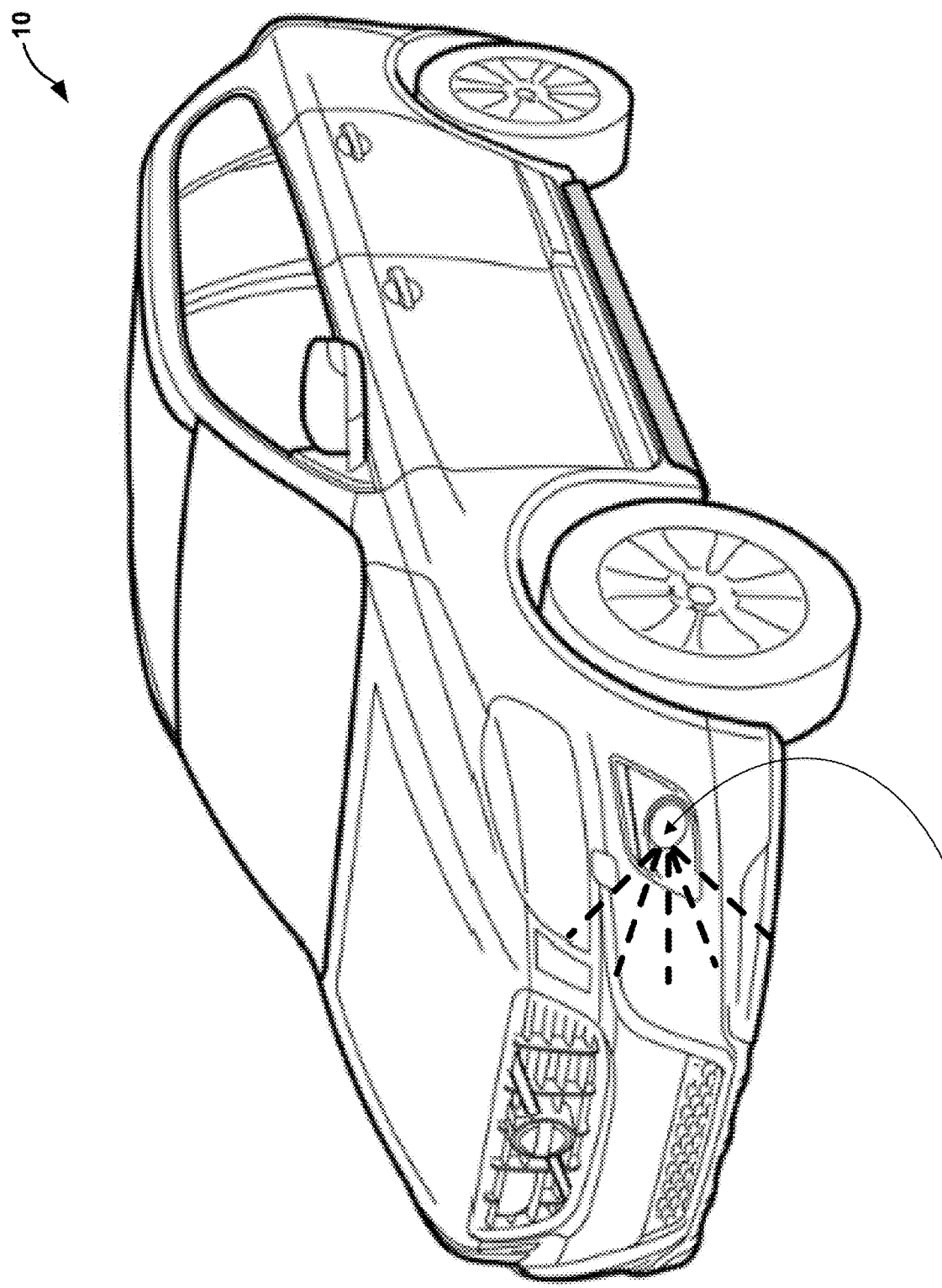

FIG. 3C is a conceptual diagram illustrating vehicle 10B with activated foglamp 44B. The "activated" state indicates that activated foglamp 44B is turned on, providing out-of-cabin illumination. Various vehicle resource usage requests, such as requests to illuminate a business entryway or a walking path, may require the activated state illustrated with respect to activated foglamp 44B, in order to fulfill the request.

Figure 3D:
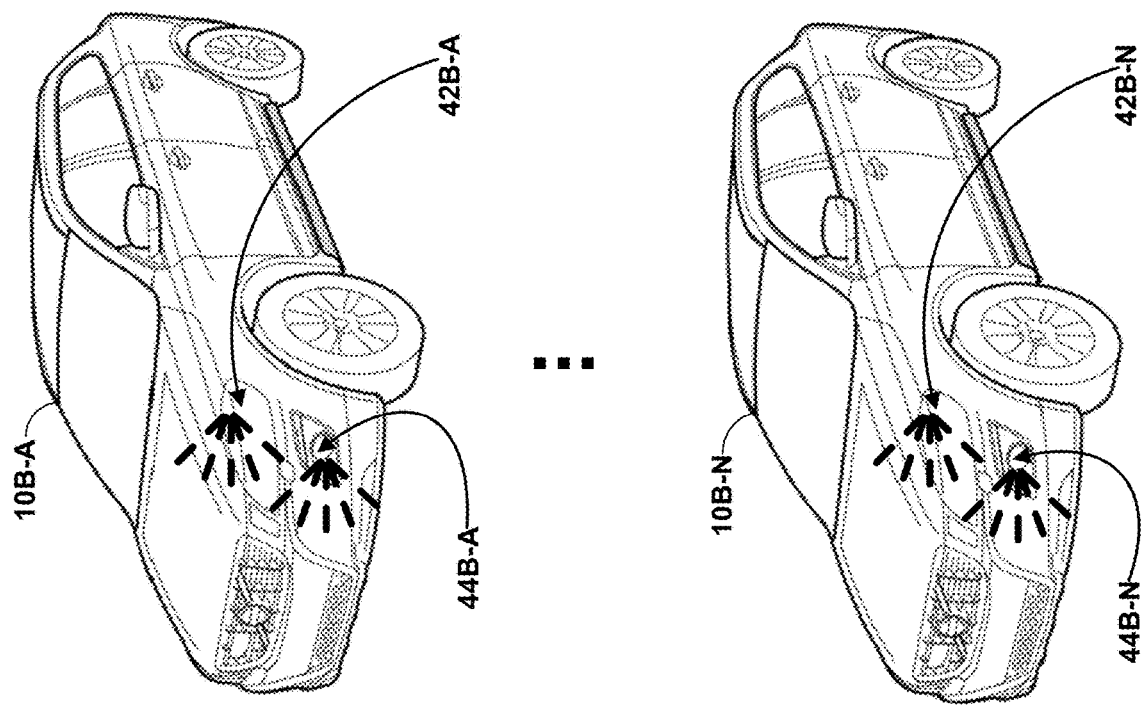
Figure 3D:
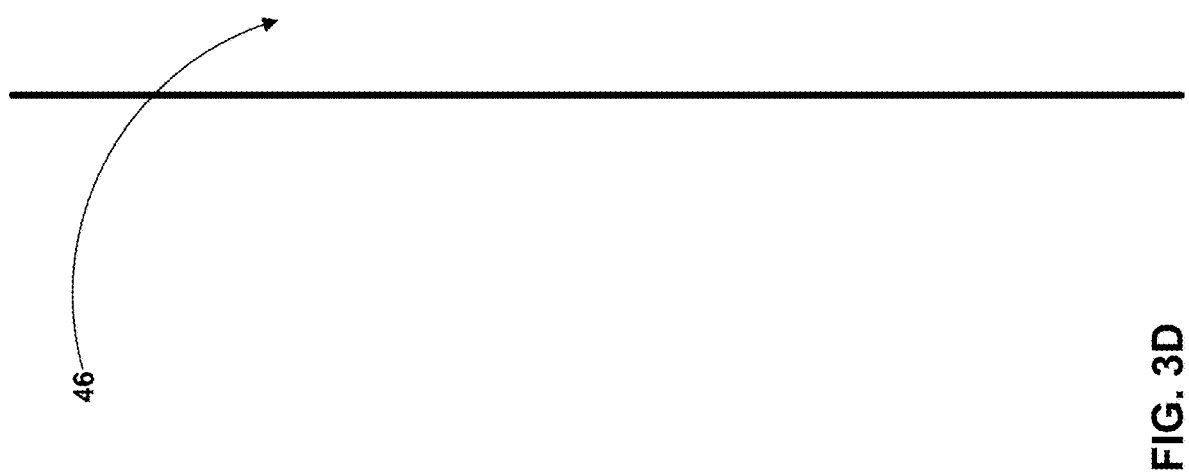

FIG. 3D illustrates a scenario in which server device 4 administrates the sharing of outdoor illumination capabilities in a smart city according to techniques of this disclosure. In the example of FIG. 3D, vehicles 10B-A through 10B-N ("vehicles 10B") represent instances of the generic vehicle 10B illustrated in FIGS. 3A-3C. Similarly, activated headlights 42A-42N ("activated headlights 42") and activated foglamps 44A-44N ("activated foglamps 44") represent instances of the generic activated headlight 42 illustrated in FIG. 3B and the generic activated foglamp 44B illustrated in FIG. 3C.

FIG. 3D illustrates walkway 46. In some examples, walkway 46 may represent a sidewalk or other public area that is on a planned walking traversal path a client that submits vehicle resource usage requests via one or more of client devices 12 illustrated in FIG. 1. In some examples, walkway 46 may represent a sidewalk or other public area that is in front of a business owned or operated by a client that submits vehicle resource usage requests via one or more of client devices 12 illustrated in FIG. 1.

In any event, activated headlights 42B and/or activated foglamps 44B may illuminate walkway 46 to provide assistance to any of these potential clients. The requesting client may pair the vehicle usage request with one or more stimuli, such as gift cards, cash payments, free/discounted charging, fuel reimbursements, free/discounted carwashes, etc. By causing (e.g., through the use of stimuli such as those described herein) the suppliers to park vehicles 10B adjacent to walkway 46 with activated headlights 42B and/or activated foglamps 44B during off-use hours at night, the client may avail of illumination benefits of safety and/or improved visibility.

Server device 4 may match multiple vehicle resource availability indicators to vehicle resource usage request in a many-to-one fashion to partially or completely fulfill the vehicle resource usage request for outdoor illumination. Server device 4 may provide match communications and stimulus information to the suppliers, and may provide acceptance communications to the client, thereby communicating the planned resource sharing scheme for the overlapping time period detected using availability information 28. Server device 4 may send instructions to supplier-side modalities 8 that cause respective display devices to display respective indications of the requested location (in this case, the general area in the immediate vicinity of walkway 46) included in the matched vehicle resource usage request.

Server device 4 may send GPS coordinates or navigation instructions to supplier-side modalities 8 or directly to vehicles 10B, directing vehicles 10B to the area adjacent to walkway 46. For example, server device 4 may send instructions to telemetry hardware of vehicles 10B to update the destination coordinates that are presently being processed by the navigation system or autonomous driving navigation module of vehicles 10B, to reflect a destination of the area adjacent to walkway 46. As another example, server device 4 may send instructions to the corresponding supplier-side modalities 8 to update the destination coordinates on locally executing mapping applications, if these supplier-side modalities 8 are being as the in-cabin navigation device during the journeys of vehicles 10B.

In the use case scenario illustrated in FIG. 3D, server device 4 implements the techniques of this disclosure to facilitate the sharing of the illumination capabilities of activated headlights 42B and/or activated foglamps 44B. By facilitating the sharing of the illumination capabilities of activated headlights 42B and/or activated foglamps 44B during nighttime off-use hours of vehicles 10B, server device 4 improves resource throughput in the smart city, and also improves safety and storefront/homefront visibility in the smart city.

Additionally, by using activated headlights 42B and/or activated foglamps 44B to illuminate the surrounding environment for the benefit of local pedestrians or dwellers/owners of adjacent buildings, server device 4 implements the techniques of this disclosure to improve the throughput of activated headlights 42B and/or activated foglamps 44B to benefit the smart city, and to use activated headlights 42B and/or activated foglamps 44B in an added way that activated headlights 42B and/or activated foglamps 44B are not typically exploited.

Figure 4A:
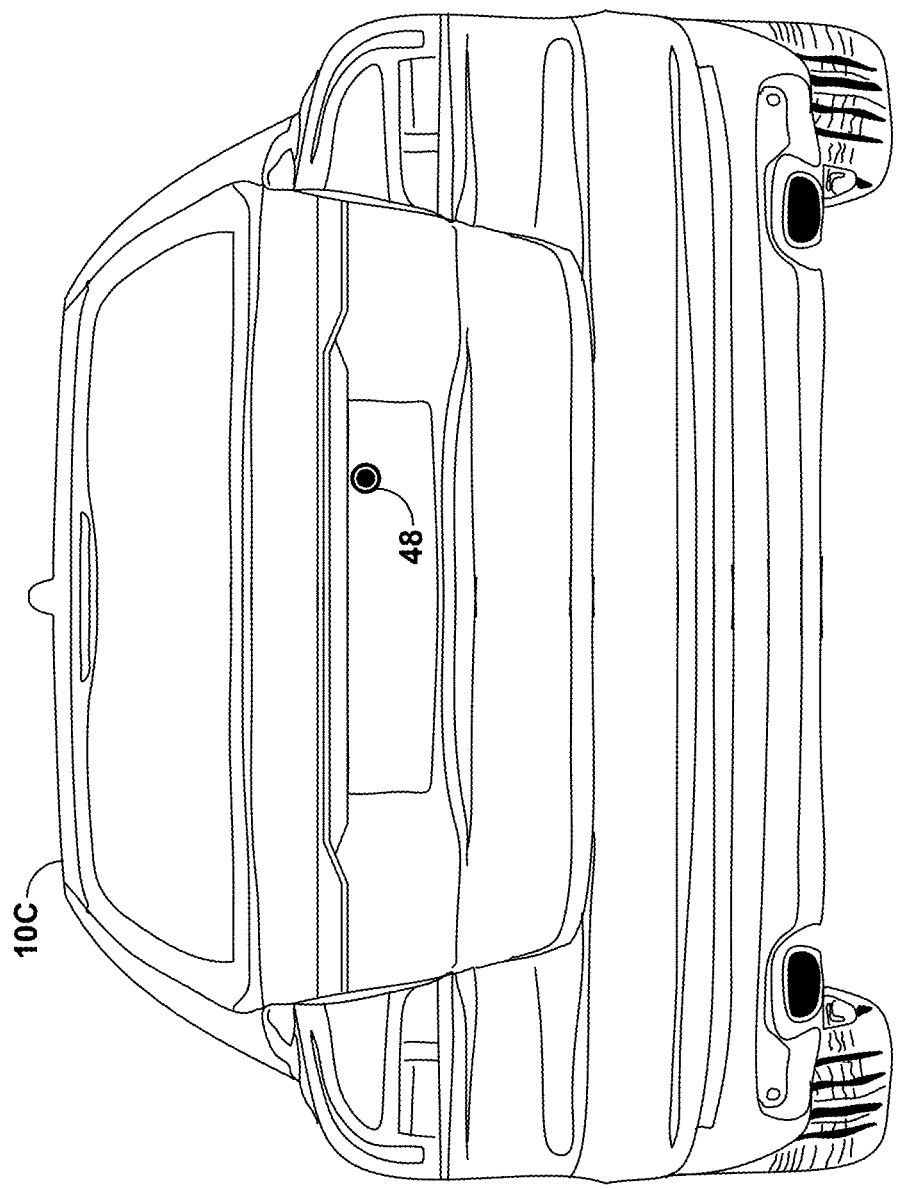
FIGS. 4A and 4B are conceptual diagrams illustrating the management of another shareable vehicle capability according to aspects of this disclosure.
Figure 4B:
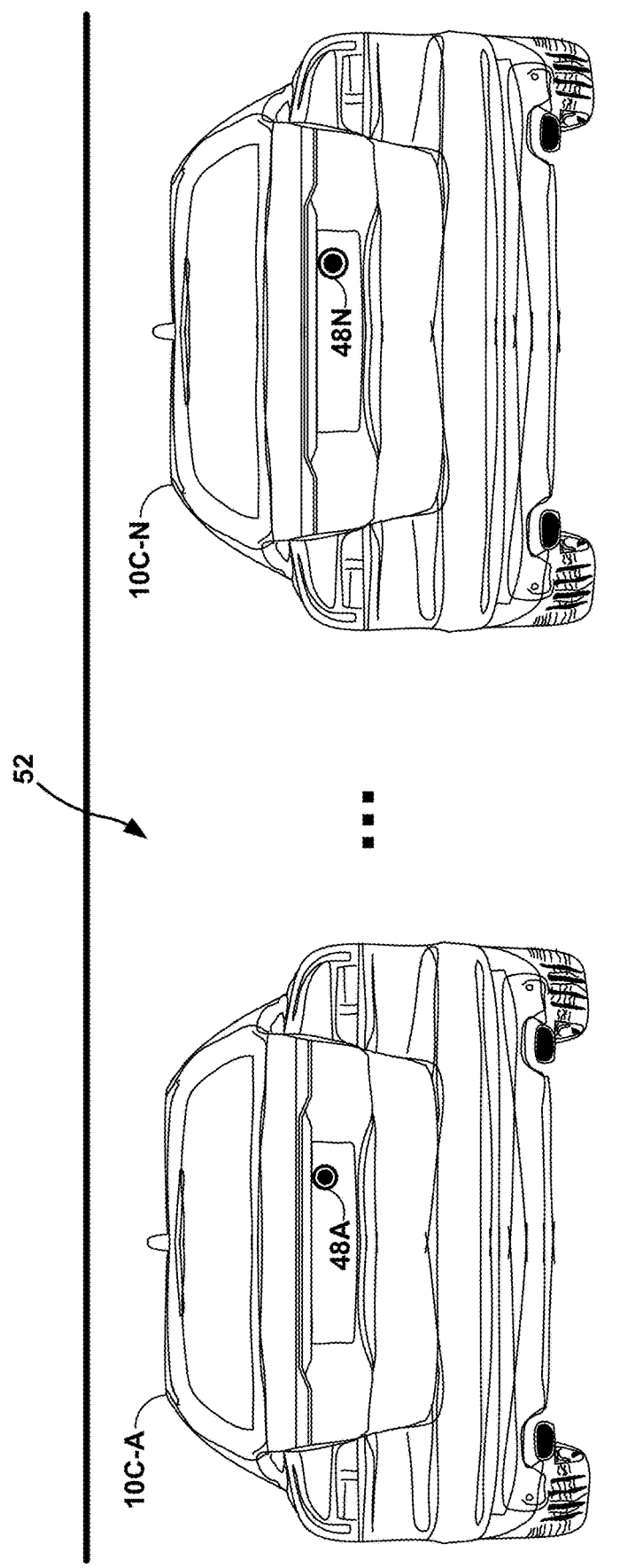

FIGS. 4A and 4B are conceptual diagrams illustrating the management of another shareable vehicle capability according to aspects of this disclosure. FIG. 4A is a conceptual diagram illustrating an example of a shareable vehicle capability of one of vehicles 10 shown in FIG. 1. Vehicle 10C is shown in FIG. 4A, although it will be appreciated that any of vehicles 10A-10N of FIG. 1 may provide the sharable vehicle capability discussed with respect to FIG. 4A. The vehicle capability shown in FIG. 4A relates to monitoring a surrounding environment, and is performed by backup camera 48. The owner, lessee, or party otherwise in control of vehicle 10C (the "supplier") may offer the use of backup camera 48 in a vehicle resource availability indicator uploaded via one of supplier-side modalities 8.

For example, the supplier may configure the vehicle resource availability indicator to identify the monitoring capability of backup camera 48 as the capability being offered for use, and to identify a discrete time period during which backup camera 48 is available to be used by a party (e.g., client) other than the supplier. For example, the vehicle resource availability indicator may identify the hours of the day during which the supplier is at work and not using vehicle 10C, or during which the supplier is at work and not using vehicle 10C, or is attending an event and is not using vehicle 10C.

In many such scenarios, the supplier may park vehicle 10C in a parking facility, such as a public lot or parking garage. The owner or operator of the parking facility may recognize a potential benefit in utilizing backup camera 48 (whether individually or in combination with camera hardware of other simultaneously parked vehicles) to enact or improve monitoring of the parking facility for security purposes.

FIG. 4B illustrates a scenario in which server device 4 administrates the sharing of visual monitoring capabilities in a smart city according to techniques of this disclosure. FIG. 4B illustrates parking facility 52. Parking facility 52 is illustrated as a closed parking garage in FIG. 4B, although it will be appreciated that parking facility 52 may be an open lot in other examples.

Vehicles 10C-A through 10C-N ("vehicles 10C") represent instances of the generic vehicle 10C illustrated in FIG. 4A. Similarly, backup cameras 48A-48N ("backup cameras 48") represent instances of the generic backup camera 48 illustrated in FIG. 4A. Parking facility 52 may be owned or operated by a client that submits vehicle resource usage requests via one or more of client devices 12 illustrated in FIG. 1.

The client in control of parking facility 52 may submit a vehicle resource usage request that solicits the use of the monitoring capabilities of backup cameras 48 during off-use hours of vehicles 10C. The client in control of parking facility 52 may request the suppliers to park vehicles 10C in parking facility 52 during off-use hours, and activate backup cameras 48 while vehicles 10C are parked in parking facility 52. Backup cameras 48, when activated, at least partially provide monitoring within parking facility 52.

The client in control of parking facility 52 may pair the vehicle resource usage request with one or more stimuli, such as free/discounted parking, gift cards, cash payments, free/discounted charging, fuel reimbursements, free/discounted carwashes, etc. By incentivizing the suppliers to park vehicles 10C in parking facility 52 and activate backup cameras 48 during off-use hours, the client may avail of visual monitoring of the happenings within parking facility 52, whereby improving security measures within parking facility 52.

Server device 4 may send instructions that cause a display device of the particular supplier-side modality 8 to display an indication of the requested location (whether as a proposed destination in the context of a navigation app running on the supplier-side modality 8, as a communication of the details of the matched offer-request combination, etc.) of the matched vehicle resource usage request. In this case, the requested location corresponds to parking facility 52. Server device 4 may match multiple vehicle resource availability indicators to the vehicle resource usage request in a many-to-one fashion to partially or completely fulfill the vehicle resource usage request for monitoring capability usage. Server device 4 may provide match communications and stimulus information to the suppliers, and may provide acceptance communications to the client, thereby communicating the planned resource sharing scheme for the overlapping time period detected using availability information 28.

Server device 4 may send GPS coordinates or navigation instructions to supplier-side modalities 8 or directly to vehicles 10C, directing vehicles 10C to parking facility 52. For example, server device 4 may send instructions to telemetry hardware of vehicles 10C to update the destination coordinates that are presently being processed by the navigation system or autonomous driving navigation module of vehicles 10C, to reflect a destination of parking facility 52. As another example, server device 4 may send instructions to the corresponding supplier-side modalities 8 to update the destination coordinates on locally executing mapping applications, if these supplier-side modalities 8 are being as the in-cabin navigation device during the journeys of vehicles 10C.

In the use case scenario illustrated in FIG. 4B, server device 4 implements the techniques of this disclosure to facilitate the sharing of the monitoring capabilities of backup cameras 48. By facilitating the sharing of the monitoring capabilities of backup cameras 48 during off-use hours of vehicles 10C, server device 4 improves resource throughput in the smart city, and also improves security measures. Moreover, by facilitating the sharing of the monitoring capabilities of backup cameras 48 during off-use hours of vehicles 10C, server device 4 may reduce the burden on third party entities that provide security monitoring services for parking facilities. Additionally, by using backup cameras 48 to monitor the surrounding environment for the benefit of owners or administrators of parking facility 52 or local law enforcement, server device 4 implements the techniques of this disclosure to improve the throughput of backup cameras 48 to benefit the smart city, and to use backup cameras 48 in an added way that backup cameras 48 are not typically exploited.

Figure 5A:
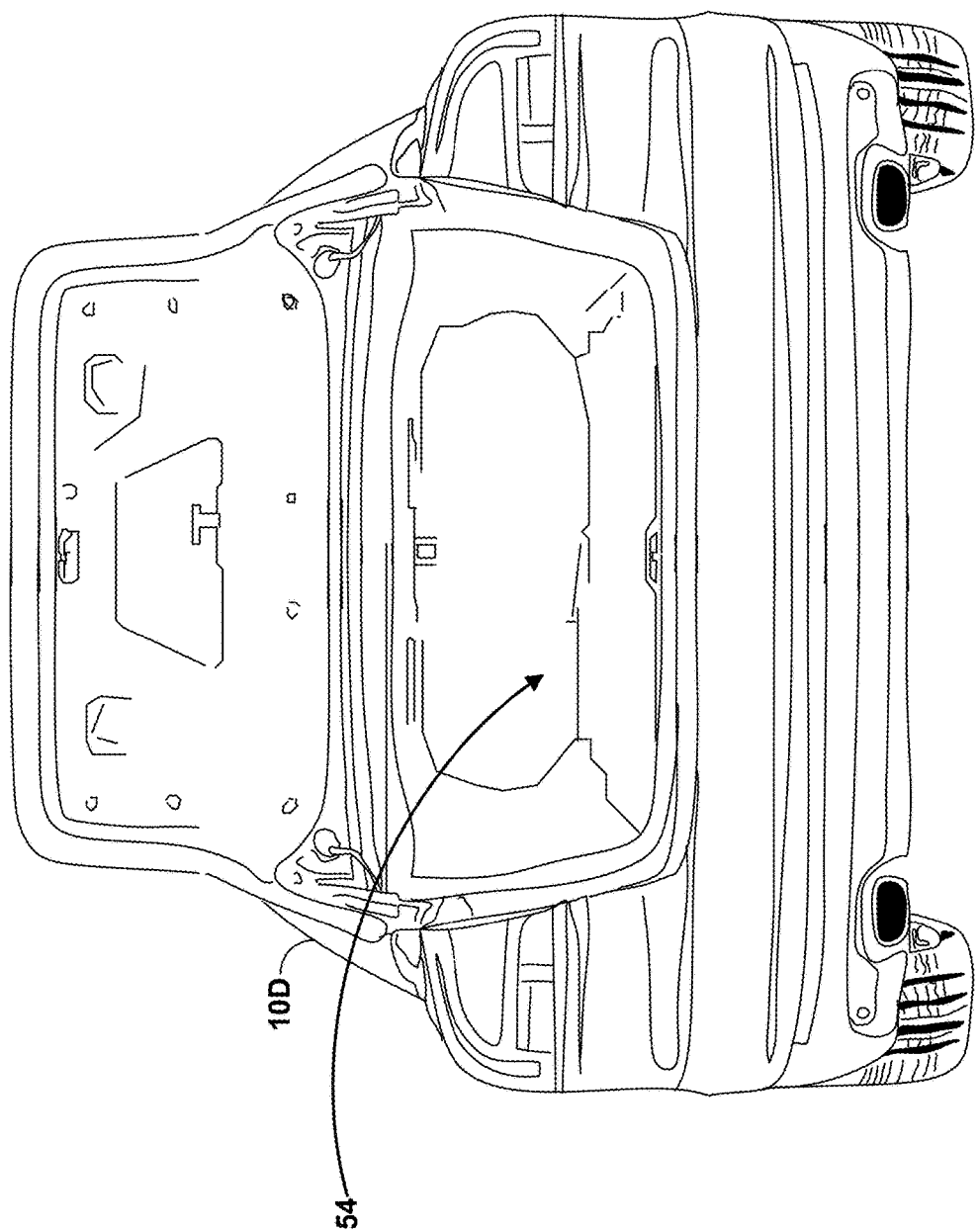
FIGS. 5A and 5B are conceptual diagrams illustrating the management of another shareable vehicle capability according to aspects of this disclosure.
Figure 5B:
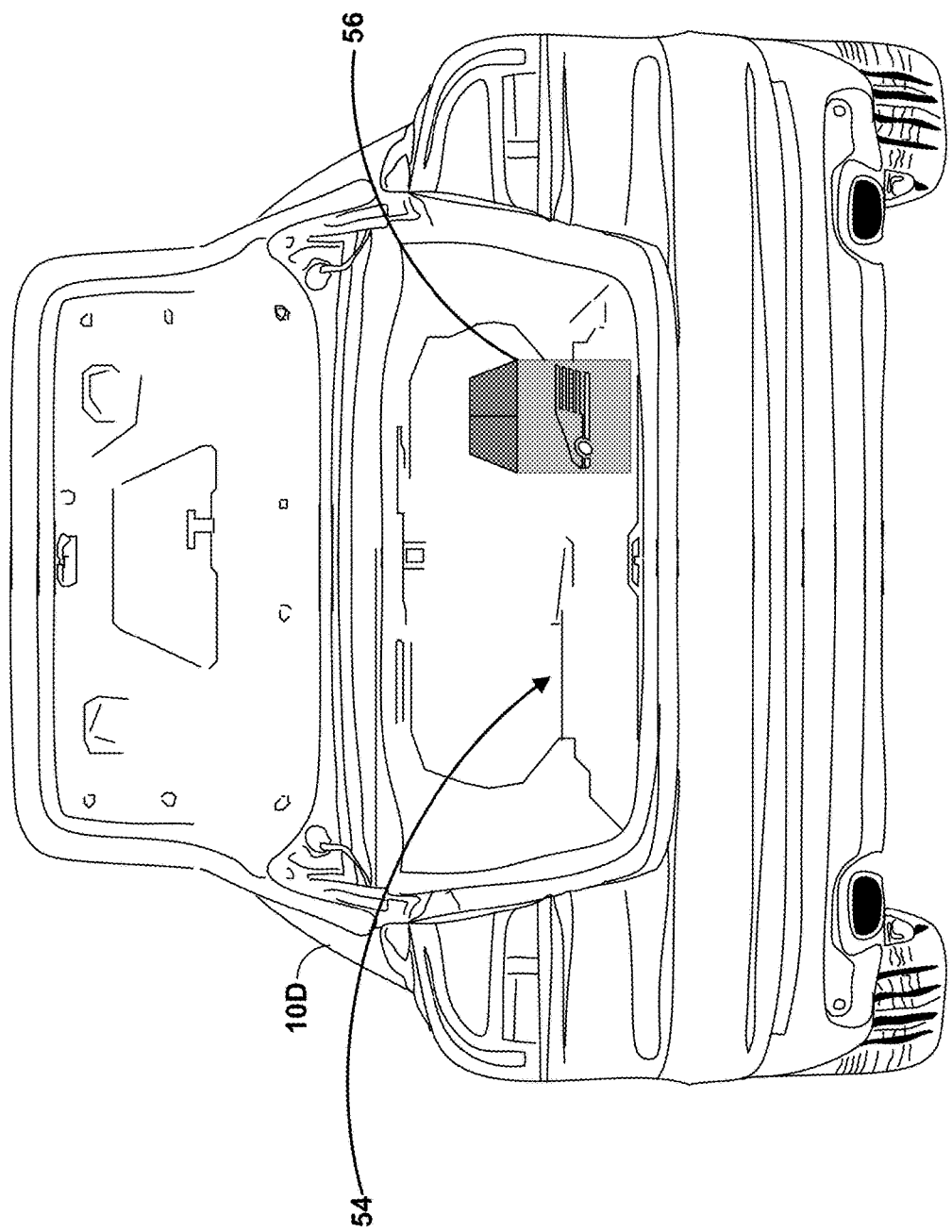

FIGS. 5A and 5B are conceptual diagrams illustrating the management of another shareable vehicle capability according to aspects of this disclosure. FIG. 5A is a conceptual diagram illustrating an example of a shareable vehicle capability of one of vehicles 10 shown in FIG. 1. Vehicle 10D is shown in FIG. 2A, although it will be appreciated that any of vehicles 10A-10N of FIG. 1 may provide the sharable vehicle capability discussed with respect to FIG. 5A. The vehicle capability shown in FIG. 2A relates to delivery space, and is provided by way of trunk space (or "boot space") 54. The owner, lessee, or party otherwise in control of vehicle 10D (the "supplier") may offer the use of trunk space 54 in a vehicle resource availability indicator uploaded via one of supplier-side modalities 8.

For example, the supplier may configure the vehicle resource availability indicator to identify the storage capability of trunk space 54 as the capability being offered for use, and to identify a discrete time period during which trunk space 54 is available to be used by a party (e.g., client) other than the supplier. For example, the vehicle resource availability indicator may identify the hours of the day during which the supplier is at work and not using vehicle 10D, or during which the supplier is at home and not using vehicle 10D (e.g., overnight or during business hours, while the supplier is at work).

FIG. 5B illustrates a scenario in which server device 4 administrates the sharing of storage capabilities in a smart city according to techniques of this disclosure. FIG. 5B illustrates delivery 56 positioned inside of trunk space 54. The client making use of the vehicle resource illustrated in FIG. 5B may be a parcel delivery service, postal carrier, or courier service. The client in charge of delivering delivery 56 may submit a vehicle resource usage request that solicits the use of the storage capability of trunk space 54 during off-use hours of vehicle 10D.

The client in this example may request the supplier to provide access to trunk space 54 during off-use hours of vehicle 10A in the illustrated parking area during off-use hours, to facilitate receipt of delivery 56. The client in this example may pair the vehicle usage request with one or more stimuli, such as free/discounted parking, gift cards, cash payments, free/discounted charging, fuel reimbursements, free/discounted carwashes, etc. By incentivizing the suppliers to park vehicle 10D to provide access to trunk space 54 during off-use hours, the client may alleviate the burden on recipients to personally receive deliveries, or to rely on third party mailbox services to receive deliveries on their behalf.

Server device 4 may match a single vehicle resource availability indicator to the vehicle resource usage request in a one-to-one fashion to fulfill the vehicle resource usage request for trunk space utilization to receive delivery 56. Server device 4 may provide the match communication and stimulus information to the supplier, and may provide an acceptance communication to the client, thereby communicating the planned resource sharing scheme for the overlapping time period detected using availability information 28.

Server device 4 may send instructions that cause a display device of the particular supplier-side modality 8 to display an indication of the requested location (whether as a proposed destination in the context of a navigation app running on the supplier-side modality 8, as a communication of the details of the matched offer-request combination, etc.) of the matched vehicle resource usage request. Server device 4 may send GPS coordinates or navigation instructions to supplier-side modalities 8 or directly to vehicle 10D, directing vehicles 10D to the parking area represented in FIGS. 5A and 5B. For example, server device 4 may send instructions to telemetry hardware of vehicle 10D to update the destination coordinates that are presently being processed by the navigation system or autonomous driving navigation module of vehicle 10D, to reflect a destination of the parking area represented in FIGS. 5A and 5B. As another example, server device 4 may send instructions to the corresponding supplier-side modality 8 to update the destination coordinates on locally-executing mapping applications, if this particular supplier-side modality 8 is functioning (e.g., a driver is using this particular supplier-side modality 8) as the in-cabin navigation device during the journeys of vehicle 10D.

Additionally, by using backup cameras 48 to monitor the surrounding environment for the benefit of owners or administrators of parking facility 52 or local law enforcement, server device 4 implements the techniques of this disclosure to improve the throughput of backup cameras 48 to benefit the smart city, and to use backup cameras 48 in an added way that backup cameras 48 are not typically exploited.

In the use case scenario illustrated in FIG. 5B, server device 4 implements the techniques of this disclosure to facilitate the sharing of the storage/holding capabilities of trunk space 54. By facilitating the sharing of the storage/holding capabilities of trunk space 54 during off-use hours of vehicle 10D, server device 4 improves resource throughput in the smart city, and also improves delivery efficiency in the smart city. Moreover, by facilitating the sharing of the storage/holding capabilities of trunk space 54 during off-use hours of vehicle 10D, server device 4 may aid in the reduce the burden on delivery services, workplace reception desks, and third-party receiving services.

Figure 6:
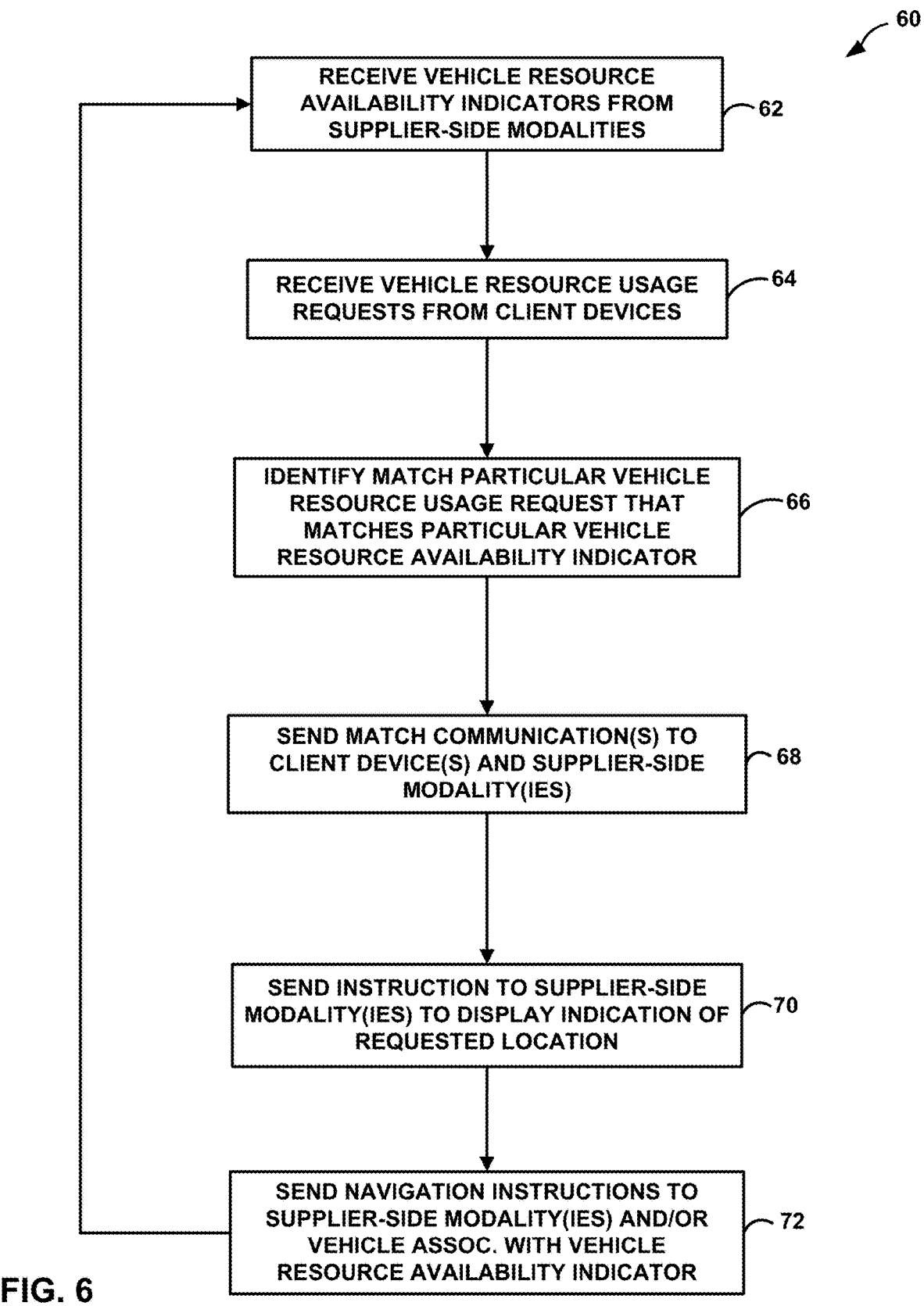
FIG. 6 is a flowchart illustrating an example process that the server device of FIG. 1 may perform to manage vehicle resource sharing in the smart city environment shown in FIG. 1.

FIG. 6 is a flowchart illustrating an example process 60 that server device 4 may perform to manage vehicle resource sharing in the smart city environment shown in FIG. 1. Process 60 may begin when processing circuitry 16 receives, via communication module 14, one or more vehicle resource availability indicators from supplier-side modalities 8 (62). Processing circuitry 16 may save the information of the received vehicle resource availability indicators to system memory 18 as respective portions of supply-side offers 24 and availability information 28.

Processing circuitry 16 may also receive, via communication module 14, one or more vehicle resource usage requests from client devices 12 (64). Processing circuitry 16 may save the information of the received vehicle resource usage requests to system memory 18 as respective portions of client-side requests 26 and availability information 28. While illustrated in a particular sequence in FIG. 6 as a non-limiting example, it will be appreciated that, in various use case scenarios, processing circuitry 16 may receive the vehicle resource availability indicators and the vehicle resource usage requests in various sequences, including interleaved or interspersed sequences. Each of the vehicle resource usage requests may include an indication of a requested vehicle resource and a requested location of the requested vehicle resource. Each of client devices 12 is associated with at least one of the vehicle resource usage requests. For example, processing circuitry 16 may associate each of the vehicle resource usage requests with a particular client device 12 (e.g., based on an originating internet protocol (IP) address, MAC address, etc.).

Smart city management unit 22 may identify a particular vehicle resource usage request that matches a particular vehicle resource availability indicator (66). For example, smart city management unit 22 may identify the match based on the one or more vehicle resource availability indicators and the one or more vehicle resource usage requests. For instance, smart city management unit 22 may identify a match between an individual vehicle resource usage request of client-side requests 26 to one or more of the vehicle resource availability indicators of supply-side offers based on various factors, such as overlapping discrete time periods reflected in availability information 28, a common vehicle capability being reflected in the offer and request, etc.

In turn, processing circuitry 16 may invoke communication module 14 to send one or more match communications to those of supplier-side modalities 8 that originated the matched offers and to those of client devices 12 that originated the matched requests (68). For example, processing circuitry 16 may send an initial match communication to vehicle resource availability indicator-originating supplier-side modalities 8, and may send an "acceptance" communication or "accepted match" communication to the vehicle resource request-originating client device 12.

Processing circuitry 16 may also invoke communication module 14 to send, to the supplier-side modality 8 that originated a matched vehicle resource availability indicator, an instruction that causes a display device of the indicator-originating supplier-side modality 8 to display an indication of the requested location included in the particular vehicle resource usage request (70). As examples, processing circuitry 16 may send, via communication module 14, an instruction that causes the display device of the indicator-originating supplier-side modality 8 to display name or address corresponding to the requested location, and/or may cause a navigation application executing on the indicator-originating supplier-side modality 8 to use coordinates of the requested location as a destination to which to navigate.

Processing circuitry 16 may also invoke communication module 14 to send navigation instructions to one or both of the indicator-originating supplier-side modality 8 and/or the particular vehicle 10 associated with the matched vehicle resource availability indicator (72). For example, processing circuitry 16 may send the requested location's coordinates as a destination to telemetry hardware of vehicles 10, or to supplier-side modalities 8 if supplier-side modalities are functioning as in-cabin navigation systems within vehicles 10. The destination coordinates may reflect coordinates of the requested location at which the matched vehicle resource usage request(s) can be fulfilled by the particular vehicle 10.

Processing circuitry 16 may continue to receive vehicle resource availability indicators using communication module 14, effectively returning to step 62 to implement process 60 in an iterative manner. In this way, server device 4 implements the techniques of this disclosure to match vehicle resource availability indicators and vehicle resource usage requests to facilitate and coordinate vehicle resource sharing capabilities under a smart city infrastructure.

Example 1: A server device comprising a communication unit, and processing circuitry in communication with the communication unit. The communication unit is configured to: receive, from a supplier-side modality, one or more vehicle resource availability indicators, wherein each of the one or more vehicle resource availability indicators includes an indication of a vehicle resource; and receive, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests. The processing circuitry is configured to: identify, based on the one or more vehicle resource availability indicators and the one or more vehicle resource usage requests, a particular vehicle resource usage request that matches a particular vehicle resource availability indicator; send, via the communication unit, a respective match communication to each of the client device associated with the particular vehicle resource usage request and the supplier-side modality; responsive to receiving an acceptance communication from the supplier side modality, send, via the communication unit and to the supplier-side modality, an instruction that causes a display device of the supplier-side modality to display an indication of the requested location included in the particular vehicle resource usage request; and send, via the communication unit, navigation instructions to one or both of the supplier side modality or a navigation system of a particular vehicle associated with the particular vehicle resource availability indicator.

Example 2: The server device of example 1, wherein each respective vehicle resource availability indicator identifies one or more vehicle capabilities that are available as a vehicle resource, and a time period during which the vehicle resource is available.

Example 3: The server device of example 2, wherein the vehicle capabilities include one or more of a trunk space availability of the vehicle, an air filter system activation of the vehicle, a camera hardware activation of the vehicle, or a headlight activation of the vehicle.

Example 4: The server device of any of examples 1-3, wherein each respective vehicle resource usage request further identifies a time period in which the requested vehicle resource is requested to be available.

Example 5: The server device of any of examples 1-4, wherein to identify the particular vehicle resource availability indicator that matches the particular vehicle resource usage request comprises prioritizing, by the processing circuitry, the vehicle resource usage requests based on one or more of: (i) heuristic data indicating acceptance history of users originating the vehicle resource availability indicators, (ii) heuristic data indicating vehicle resource usage fulfillment history of the users originating the vehicle resource availability indicators, or (iii) a loyalty membership of one or both of the users originating the subset of the vehicle resource availability indicators or a user originating the vehicle resource usage request.

Example 6: The server device of any of examples 1-5, wherein the processing circuitry is further configured to update, based on identifying the particular vehicle resource availability indicator that matches the particular vehicle resource usage request, original destination coordinates to form the destination coordinates at or near the requested location included in the particular vehicle resource usage request.

Example 7: The server device of any of examples 1-6, wherein the communication unit comprises interface hardware configured to communicate with telemetry hardware of the particular vehicle associated with the particular vehicle resource availability indicator.

Example 8: The server device of any of examples 1-7, further comprising a memory in communication with the processing circuitry, wherein the processing circuitry is configured to store the one or more vehicle resource availability indicators or the one or more vehicle resource usage requests to the memory.

Example 9: An apparatus comprising: means for receiving, from a supplier-side modality, one or more vehicle resource availability indicators, wherein each of the one or more vehicle resource availability indicators includes an indication of a vehicle resource; means for receiving, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests; means for identifying, based on the one or more vehicle resource availability indicators and the one or more vehicle resource usage requests, a particular vehicle resource usage request that matches a particular vehicle resource availability indicator; means for sending a respective match communication to each of the client device associated with the particular vehicle resource usage request and the supplier-side modality; means for sending, responsive to receiving an acceptance communication from the supplier side modality and to the supplier-side modality, an instruction that causes a display device of the supplier-side modality to display an indication of the requested location included in the particular vehicle resource usage request; and means for sending navigation instructions to one or both of the supplier side modality or a navigation system of a particular vehicle associated with the particular vehicle resource availability indicator.

Example 10: The apparatus of example 9, wherein each respective vehicle resource availability indicator identifies one or more vehicle capabilities that are available as a vehicle resource, and a time period during which the vehicle resource is available.

Example 11: The apparatus of example 10, wherein the vehicle capabilities include one or more of a trunk space availability of the vehicle, an air filter system activation of the vehicle, a camera hardware activation of the vehicle, or a headlight activation of the vehicle.

Example 12: The apparatus of any of examples 9-11, wherein each respective vehicle resource usage request further identifies a time period in which the requested vehicle resource is requested to be available.

Example 13: The apparatus of any of examples 9-12, wherein to identify the particular vehicle resource availability indicator that matches the particular vehicle resource usage request comprises prioritizing, by the processing circuitry, the vehicle resource usage requests based on one or more of: (i) heuristic data indicating acceptance history of users originating the vehicle resource availability indicators, (ii) heuristic data indicating vehicle resource usage fulfillment history of the users originating the vehicle resource availability indicators, or (iii) a loyalty membership of one or both of the users originating the subset of the vehicle resource availability indicators or a user originating the vehicle resource usage request.

Example 14: The apparatus of any of examples 9-13, wherein the processing circuitry is further configured to update, based on identifying the particular vehicle resource availability indicator that matches the particular vehicle resource usage request, original destination coordinates to form the destination coordinates at or near the requested location included in the particular vehicle resource usage request.

Example 15: A method implemented using processing circuitry. The method comprises receiving, via a communication unit, from a supplier-side modality, one or more vehicle resource availability indicators, wherein each of the one or more vehicle resource availability indicators includes an indication of a vehicle resource; receiving, via the communication unit, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests; identifying, based on the one or more vehicle resource availability indicators and the one or more vehicle resource usage requests, a particular vehicle resource usage request that matches a particular vehicle resource availability indicator; sending, via the communication unit, a respective match communication to each of the client device associated with the particular vehicle resource usage request and the supplier-side modality; responsive to receiving an acceptance communication from the supplier side modality, sending, by the processing circuitry and to the supplier-side modality, an instruction that causes a display device of the supplier-side modality to display an indication of the requested location included in the particular vehicle resource usage request; and sending, by the processing circuitry, via the communication unit, navigation instructions to one or both of the supplier side modality or a navigation system of a particular vehicle associated with the particular vehicle resource availability indicator.

Example 16: The method of example 15, wherein each respective vehicle resource availability indicator identifies one or more vehicle capabilities that are available as a vehicle resource, and a time period during which the vehicle resource is available.

Example 17: The method of example 16, wherein the vehicle capabilities include one or more of a trunk space availability of the vehicle, an air filter system activation of the vehicle, a camera hardware activation of the vehicle, or a headlight activation of the vehicle.

Example 18: The method of any of examples 15-17, wherein each respective vehicle resource usage request further identifies a time period in which the requested vehicle resource is requested to be available.

Example 19: The method of any of examples 15-18, wherein to identify the particular vehicle resource availability indicator that matches the particular vehicle resource usage request comprises prioritizing, by the processing circuitry, the vehicle resource usage requests based on one or more of: (i) heuristic data indicating acceptance history of users originating the vehicle resource availability indicators, (ii) heuristic data indicating vehicle resource usage fulfillment history of the users originating the vehicle resource availability indicators, or (iii) a loyalty membership of one or both of the users originating the subset of the vehicle resource availability indicators or a user originating the vehicle resource usage request.

Example 20: The method of any of examples 15-18, further comprising updating, by the processing circuitry, based on identifying the particular vehicle resource availability indicator that matches the particular vehicle resource usage request, original destination coordinates to form the destination coordinates at or near the requested location included in the particular vehicle resource usage request.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable data storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), processing circuitry (e.g., fixed function circuitry, programmable circuitry, or any combination or other equivalent integrated or discrete logic circuitry. Accordingly, the term "processor," as used herein may refer to any of the foregoing structure or any other structure suitable for implementation of the techniques described herein. One or more "processors" of this disclosure may be implemented as processing circuitry, such as fixed-function circuitry, programmable circuitry, or a combination of fixed-function circuitry and programmable circuitry. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples of this disclosure have been described. These and other examples are within the scope of the following claims.

What is claimed is:

1. A server device comprising:
   a communication module configured to:
      receive, from a supplier-side modality, one or more vehicle resource availability indicators, wherein:
         each of the one or more vehicle resource availability indicators includes an indication of a vehicle resource available during the vehicle's off-use hours,
         each respective vehicle resource availability indicator identifies one or more vehicle capabilities that are available as a vehicle resource, and a time period during which the vehicle resource is available, and
         the vehicle capabilities include an air filter system activation of the vehicle; and
      receive, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests;
   processing circuitry in communication with the communication module, the processing circuitry being configured to:
      identify, based on the one or more vehicle resource availability indicators and the one or more vehicle resource usage requests, a particular vehicle resource usage request that matches a particular vehicle resource availability indicator;
      send, via the communication module, a respective match communication to each of the client device associated with the particular vehicle resource usage request and the supplier-side modality;
      responsive to receiving an acceptance communication from the supplier side modality, send, via the communication module and to the supplier-side modality, an instruction that causes a display device of the supplier-side modality to display an indication of the requested location included in the particular vehicle resource usage request; and
      send, via the communication module, navigation instructions to one or both of the supplier side modality or a navigation system of a particular vehicle associated with the particular vehicle resource availability indicator.

2. The server device of claim 1, wherein the vehicle capabilities include one or more of a trunk space availability of the vehicle, a camera hardware activation of the vehicle, or a headlight activation of the vehicle.

3. The server device of claim 1, wherein each respective vehicle resource usage request further identifies a time period in which the requested vehicle resource is requested to be available.

4. The server device of claim 1, wherein to identify the particular vehicle resource availability indicator that matches the particular vehicle resource usage request comprises prioritizing, by the processing circuitry, the vehicle resource usage requests based on heuristic data indicating acceptance history of users originating the vehicle resource availability indicators.

5. The server device of claim 1, wherein the processing circuitry is further configured to update, based on identifying the particular vehicle resource availability indicator that matches the particular vehicle resource usage request, original destination coordinates to form the destination coordinates at or near the requested location included in the particular vehicle resource usage request.

6. The server device of claim 1, wherein the communication module comprises interface hardware configured to communicate with telemetry hardware of the particular vehicle associated with the particular vehicle resource availability indicator.

7. The server device of claim 1, further comprising a memory in communication with the processing circuitry, wherein the processing circuitry is configured to store the one or more vehicle resource availability indicators or the one or more vehicle resource usage requests to the memory.

8. The server device of claim 1, wherein to identify the particular vehicle resource availability indicator that matches the particular vehicle resource usage request comprises prioritizing, by the processing circuitry, the vehicle resource usage requests based on heuristic data indicating vehicle resource usage fulfillment history of the users originating the vehicle resource availability indicators.

9. The server device of claim 1, wherein to identify the particular vehicle resource availability indicator that matches the particular vehicle resource usage request comprises prioritizing, by the processing circuitry, the vehicle resource usage requests based on a loyalty membership of one or both of the users originating a subset of the vehicle resource availability indicators or a user originating the vehicle resource usage request.

10. An apparatus comprising:
 means for receiving, from a supplier-side modality, one or more vehicle resource availability indicators, wherein:
  each of the one or more vehicle resource availability indicators includes an indication of a vehicle resource available during the vehicle's off-use hours,
  each respective vehicle resource availability indicator identifies one or more vehicle capabilities that are available as a vehicle resource, and a time period during which the vehicle resource is available, and
  the vehicle capabilities include an air filter system activation of the vehicle;
 means for receiving, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests;
 means for identifying, based on the one or more vehicle resource availability indicators and the one or more vehicle resource usage requests, a particular vehicle resource usage request that matches a particular vehicle resource availability indicator;
 means for sending a respective match communication to each of the client device associated with the particular vehicle resource usage request and the supplier-side modality;
 means for sending, responsive to receiving an acceptance communication from the supplier side modality and to the supplier-side modality, an instruction that causes a display device of the supplier-side modality to display an indication of the requested location included in the particular vehicle resource usage request; and
 means for sending navigation instructions to one or both of the supplier side modality or a navigation system of a particular vehicle associated with the particular vehicle resource availability indicator.

11. The apparatus of claim 10, wherein the vehicle capabilities include one or more of a trunk space availability of the vehicle, a camera hardware activation of the vehicle, or a headlight activation of the vehicle.

12. The apparatus of claim 10, wherein each respective vehicle resource usage request further identifies a time period in which the requested vehicle resource is requested to be available.

13. The apparatus of claim 10, wherein to identify the particular vehicle resource availability indicator that matches the particular vehicle resource usage request comprises prioritizing the vehicle resource usage requests based on one or more of: (i) heuristic data indicating acceptance history of users originating the vehicle resource availability indicators, or (ii) heuristic data indicating vehicle resource usage fulfillment history of the users originating the vehicle resource availability indicators.

14. The apparatus of claim 10, further comprising means for updating, based on identifying the particular vehicle resource availability indicator that matches the particular vehicle resource usage request, original destination coordinates to form the destination coordinates at or near the requested location included in the particular vehicle resource usage request.

15. The apparatus of claim 10, wherein to identify the particular vehicle resource availability indicator that matches the particular vehicle resource usage request comprises prioritizing the vehicle resource usage requests based on a loyalty membership of one or both of the users originating a subset of the vehicle resource availability indicators or a user originating the vehicle resource usage request.

16. A method implemented by one or more processors, the method comprising:
 receiving, via a communication module, from a supplier-side modality, one or more vehicle resource availability indicators, wherein:
  each of the one or more vehicle resource availability indicators includes an indication of a vehicle resource available during the vehicle's off-use hours,
  each respective vehicle resource availability indicator identifies one or more vehicle capabilities that are available as a vehicle resource, and a time period during which the vehicle resource is available, and
  the vehicle capabilities include an air filter system activation of the vehicle;
 receiving, via the communication module, from one or more client devices, one or more vehicle resource usage requests, wherein each of the one or more vehicle resource usage requests includes an indication of a requested vehicle resource and a requested location of the requested vehicle resource, wherein each client device of the one or more client devices is associated with one of the one or more vehicle resource usage requests;
 identifying, based on the one or more vehicle resource availability indicators and the one or more vehicle resource usage requests, a particular vehicle resource usage request that matches a particular vehicle resource availability indicator;
 sending, via the communication module, a respective match communication to each of the client device associated with the particular vehicle resource usage request and the supplier-side modality;
 responsive to receiving an acceptance communication from the supplier side modality, sending, by the one or more processors and to the supplier-side modality, an instruction that causes a display device of the supplier-side modality to display an indication of the requested location included in the particular vehicle resource usage request; and
 sending, by the one or more processors, via the communication module, navigation instructions to one or both of the supplier side modality or a navigation system of a particular vehicle associated with the particular vehicle resource availability indicator.

17. The method of claim 16, wherein the vehicle capabilities include one or more of a trunk space availability of the vehicle, a camera hardware activation of the vehicle, or a headlight activation of the vehicle.

18. The method of claim 16, wherein each respective vehicle resource usage request further identifies a time period in which the requested vehicle resource is requested to be available.

19. The method of claim 16, wherein to identify the particular vehicle resource availability indicator that matches the particular vehicle resource usage request comprises prioritizing, by the one or more processors, the vehicle resource usage requests based on one or more of: (i) heuristic data indicating acceptance history of users originating the vehicle resource availability indicators, (ii) heuristic data indicating vehicle resource usage fulfillment history of the users originating the vehicle resource availability indicators, or (iii) a loyalty membership of one or both of the users originating a subset of the vehicle resource availability indicators or a user originating the vehicle resource usage request.

20. The method of claim 16, further comprising updating, by the one or more processors, based on identifying the particular vehicle resource availability indicator that matches the particular vehicle resource usage request, original destination coordinates to form the destination coordinates at or near the requested location included in the particular vehicle resource usage request.

* * * * *